March 23, 1954     D. D. DEMAREST ET AL     2,672,649
METHOD FOR REMOVING CASINGS FROM SAUSAGES AND THE LIKE
Original Filed June 15, 1950     13 Sheets-Sheet 1
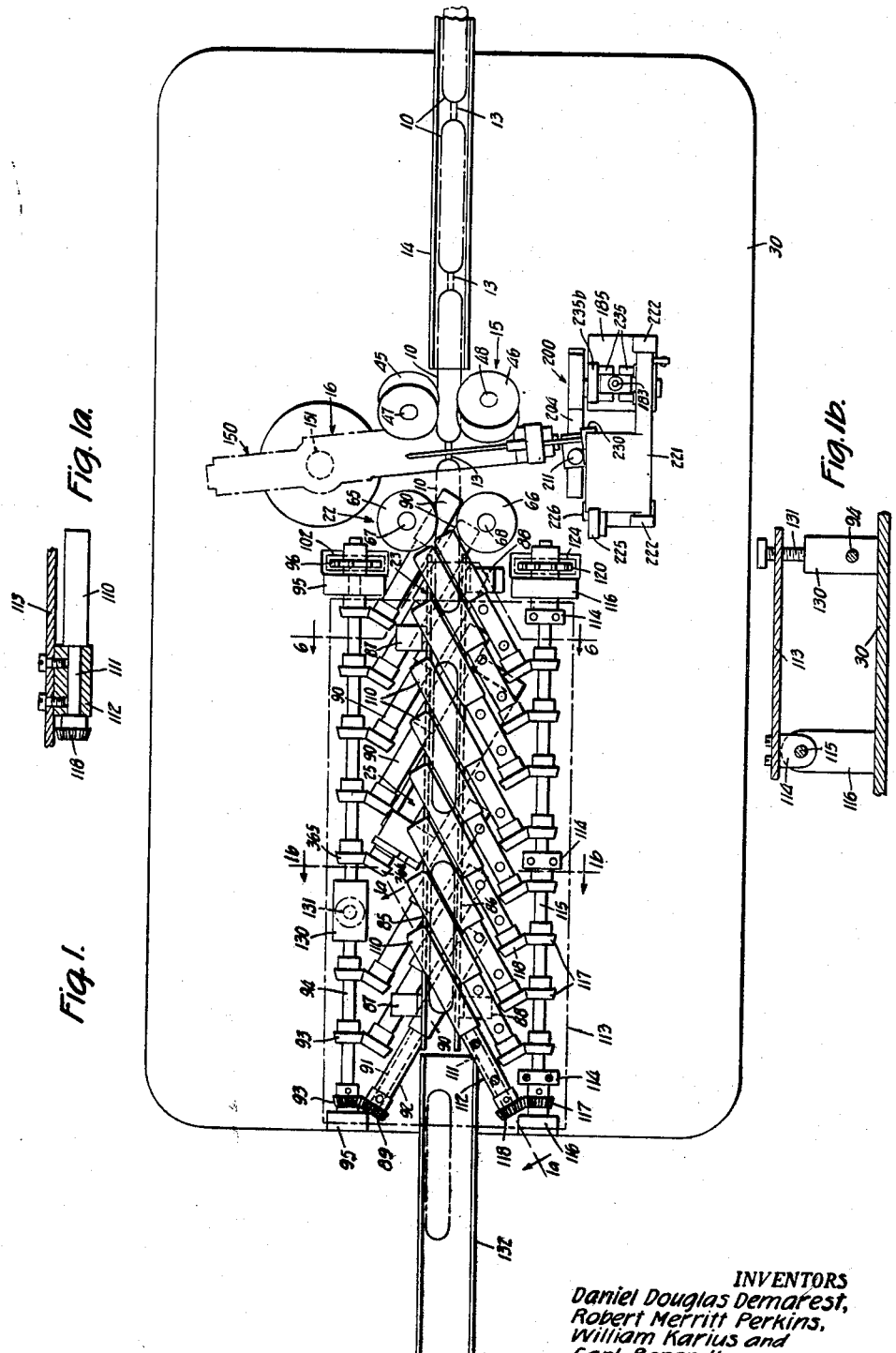
INVENTORS
Daniel Douglas Demarest,
Robert Merritt Perkins,
William Karius and
Carl Berendt
BY
ATTORNEYS

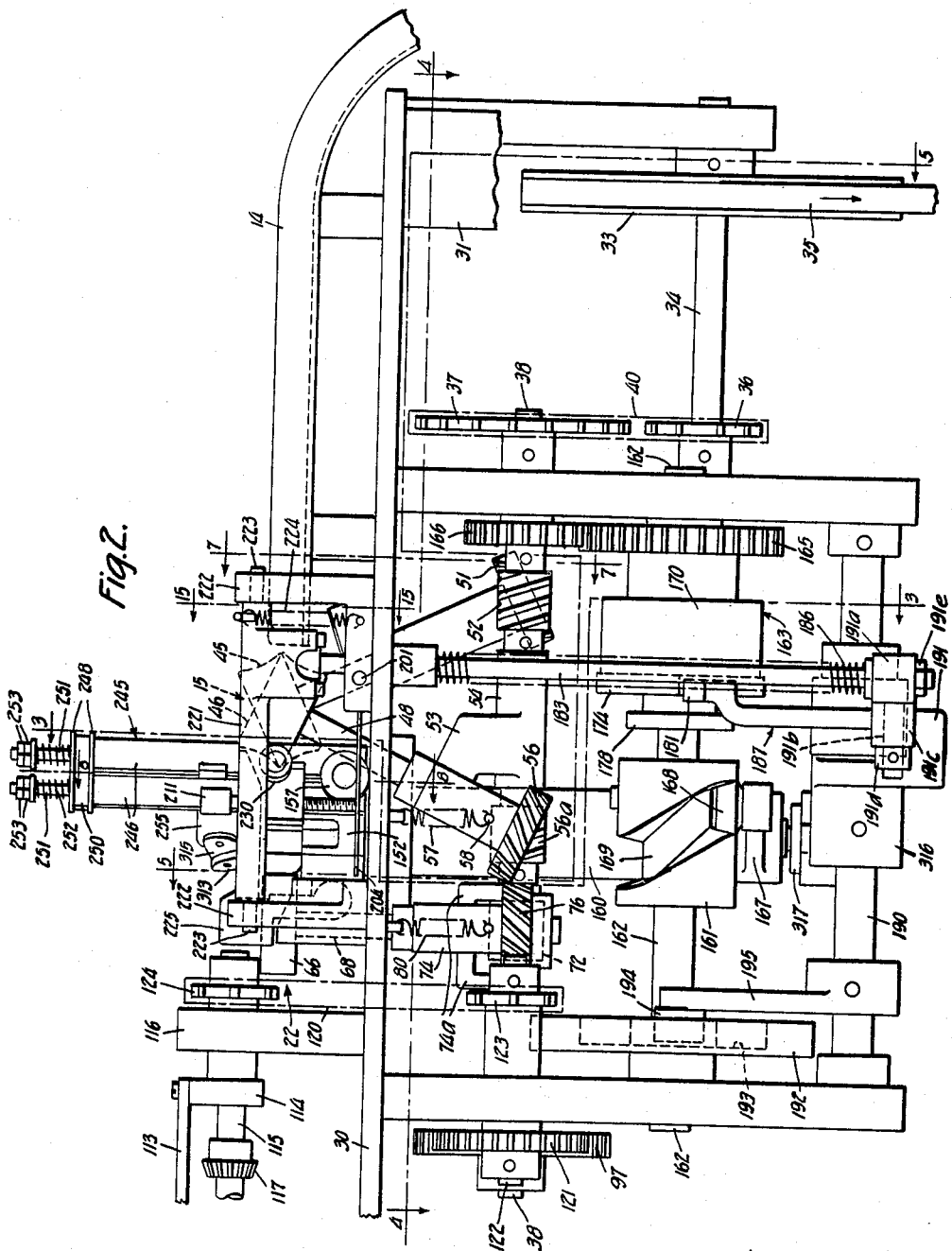

March 23, 1954     D. D. DEMAREST ET AL     2,672,649
METHOD FOR REMOVING CASINGS FROM SAUSAGES AND THE LIKE
Original Filed June 15, 1950     13 Sheets-Sheet 3
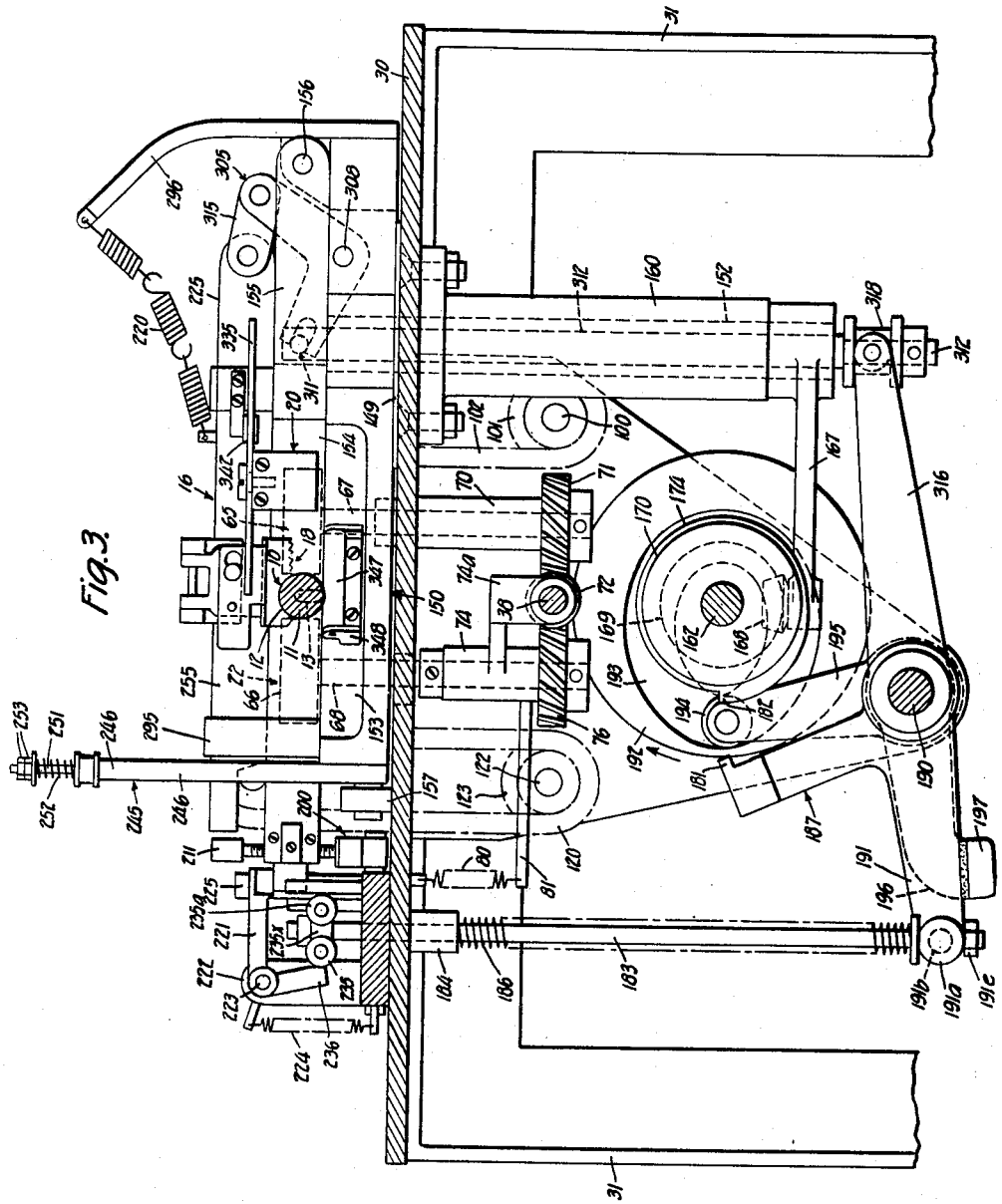
INVENTORS
Daniel Douglas Demarest,
Robert Merritt Perkins,
William Karius and
Carl Berendt
BY Moses, Nolte, Crews & Berry
ATTORNEYS

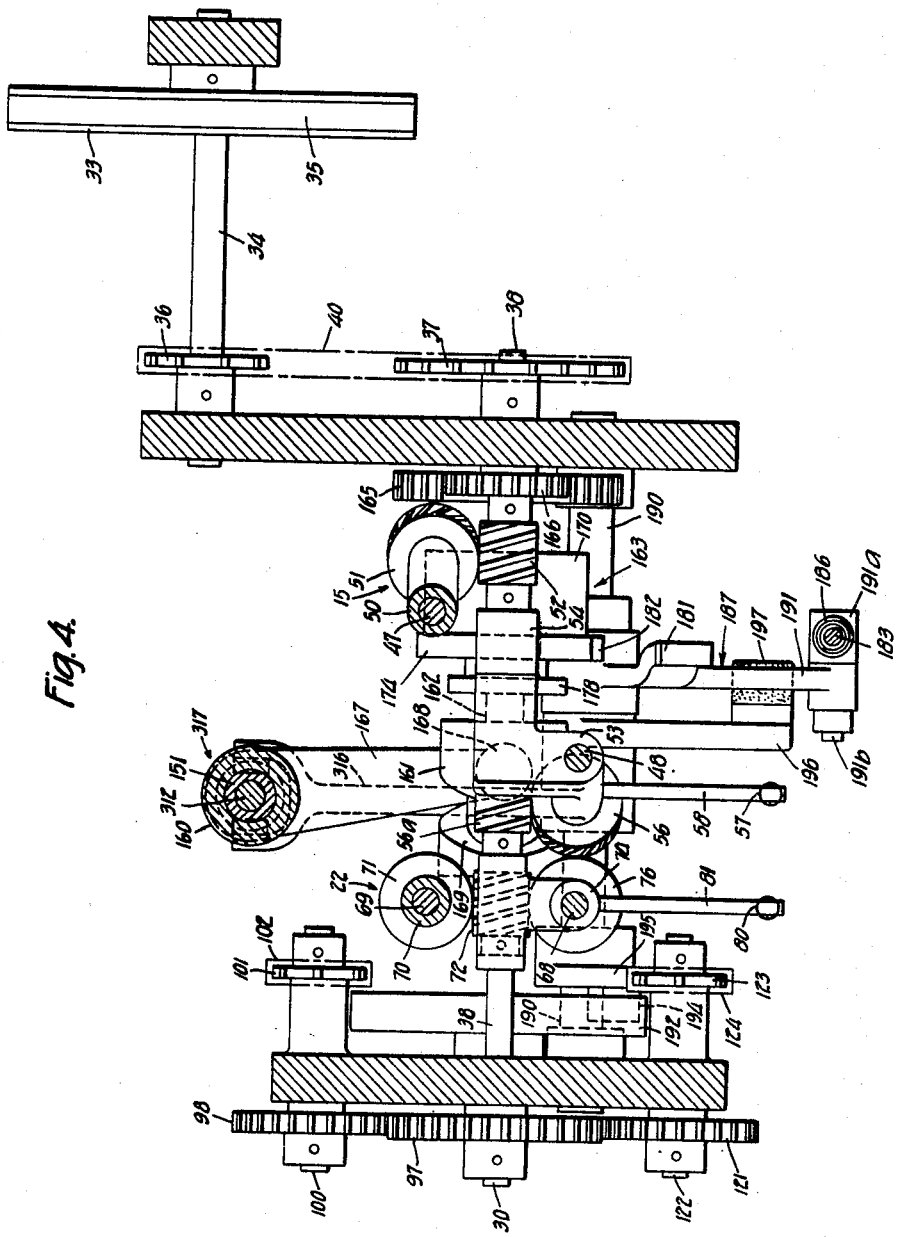

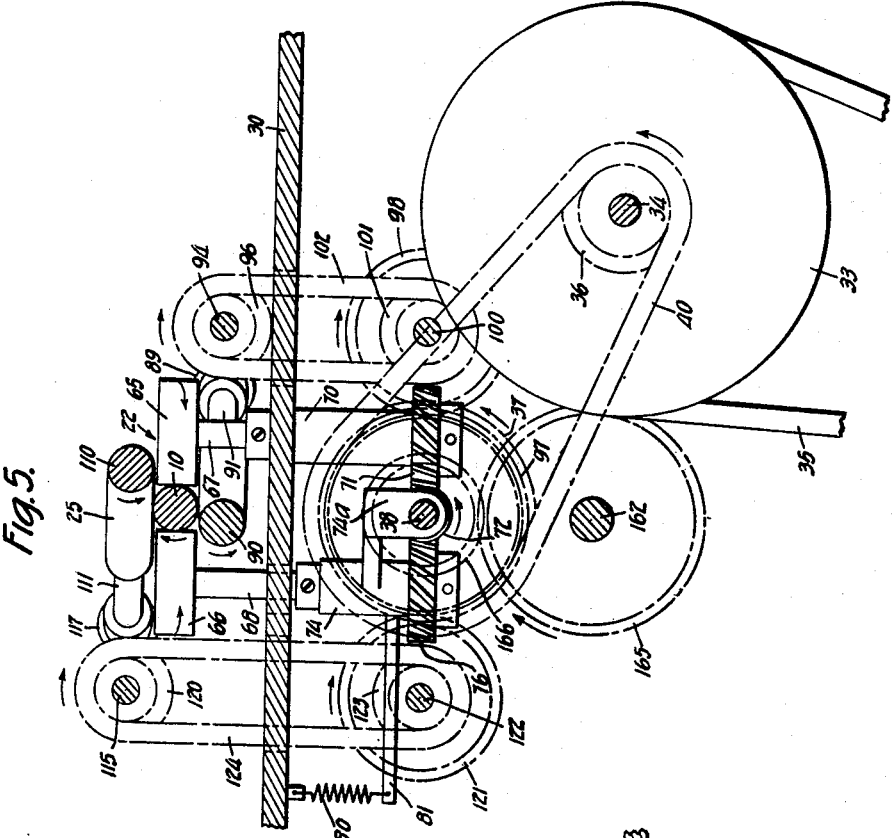

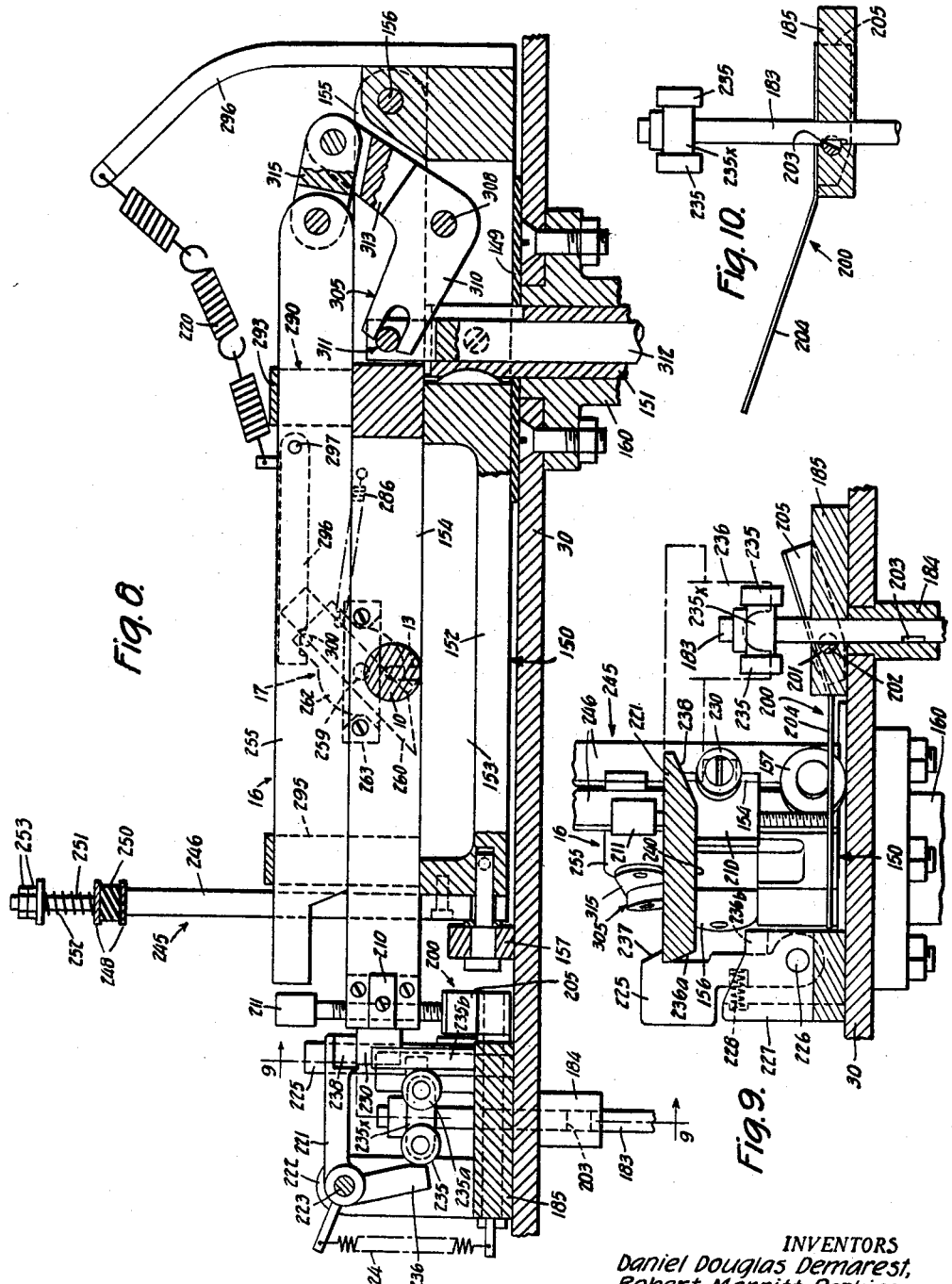

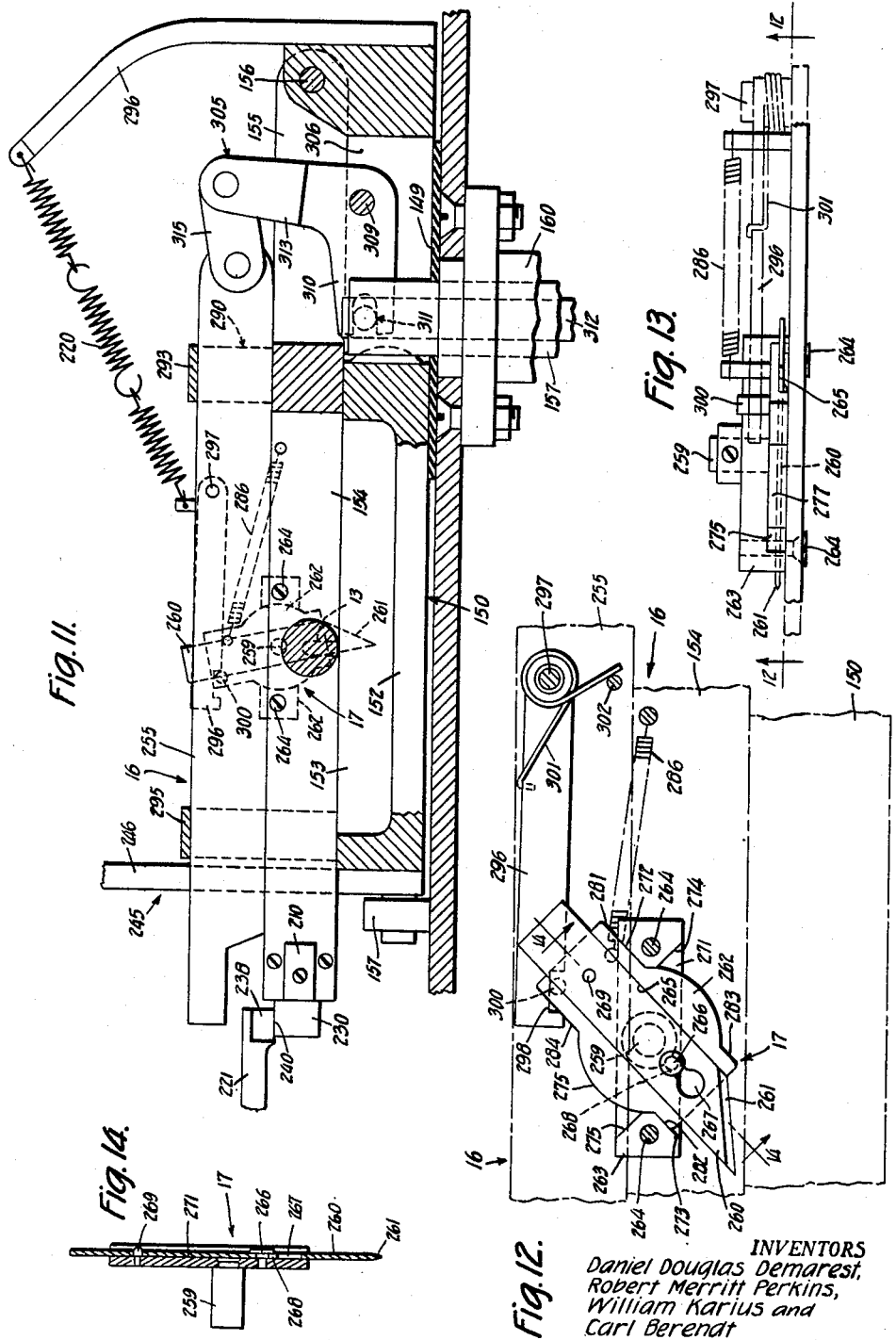

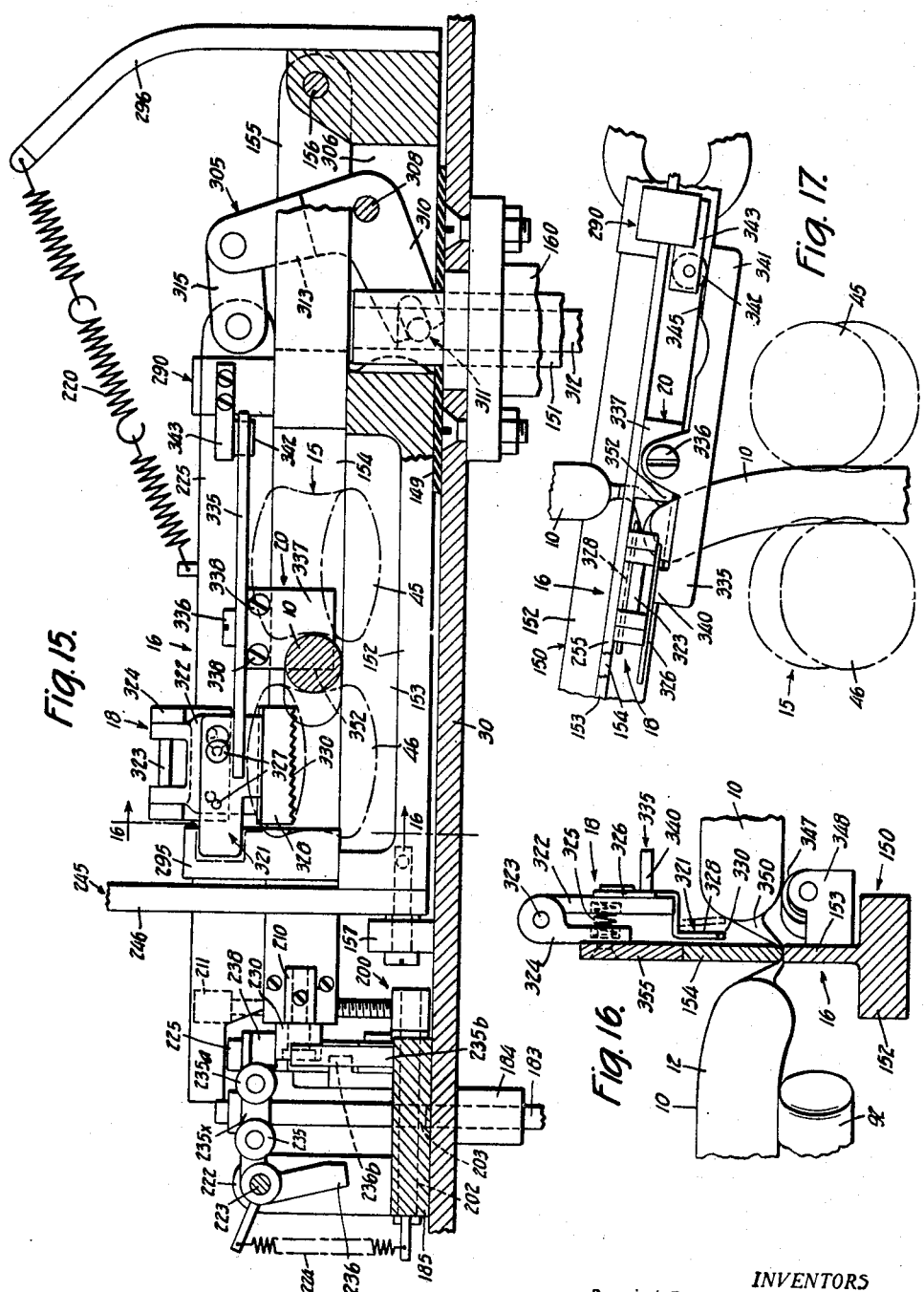

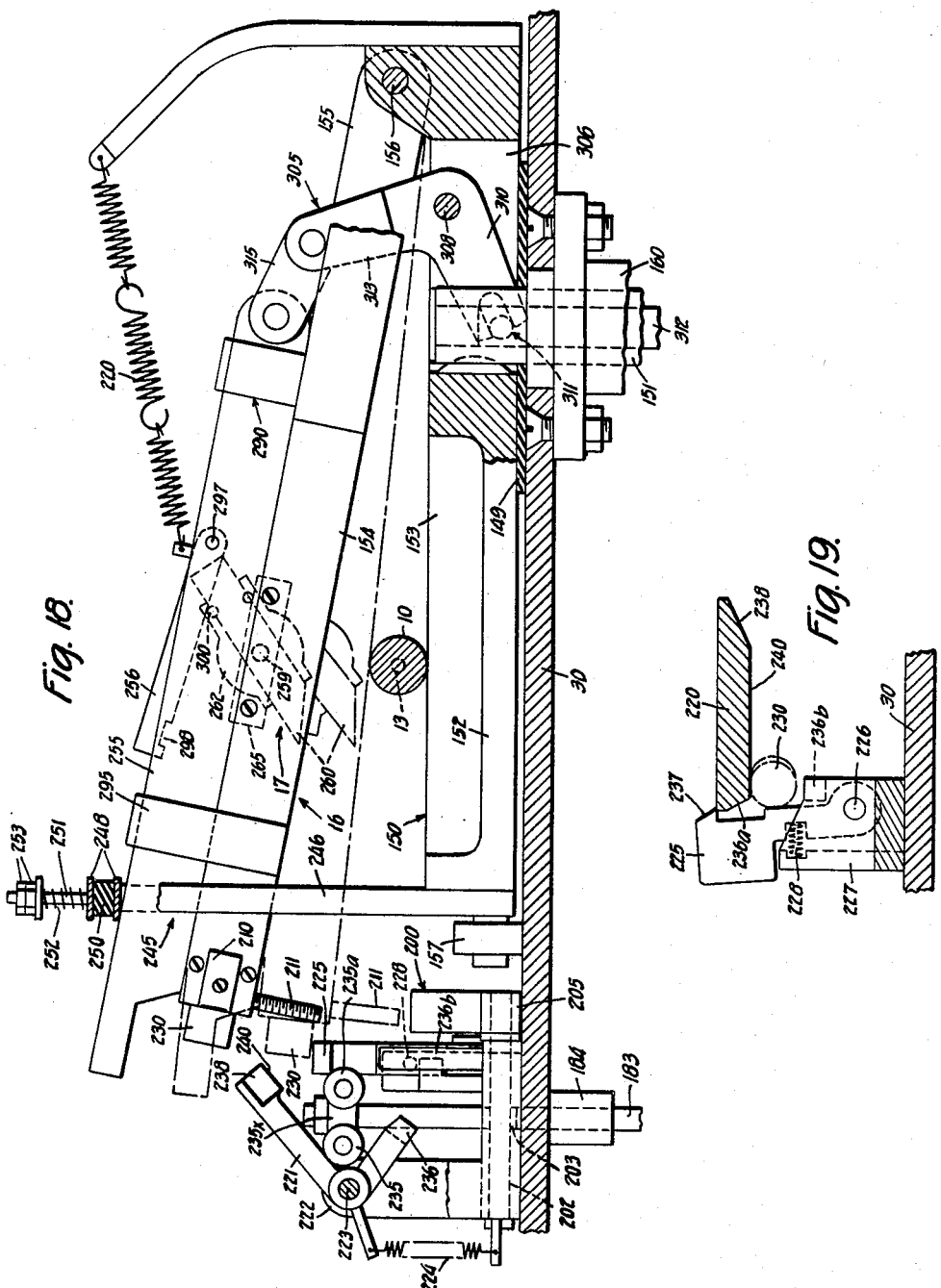

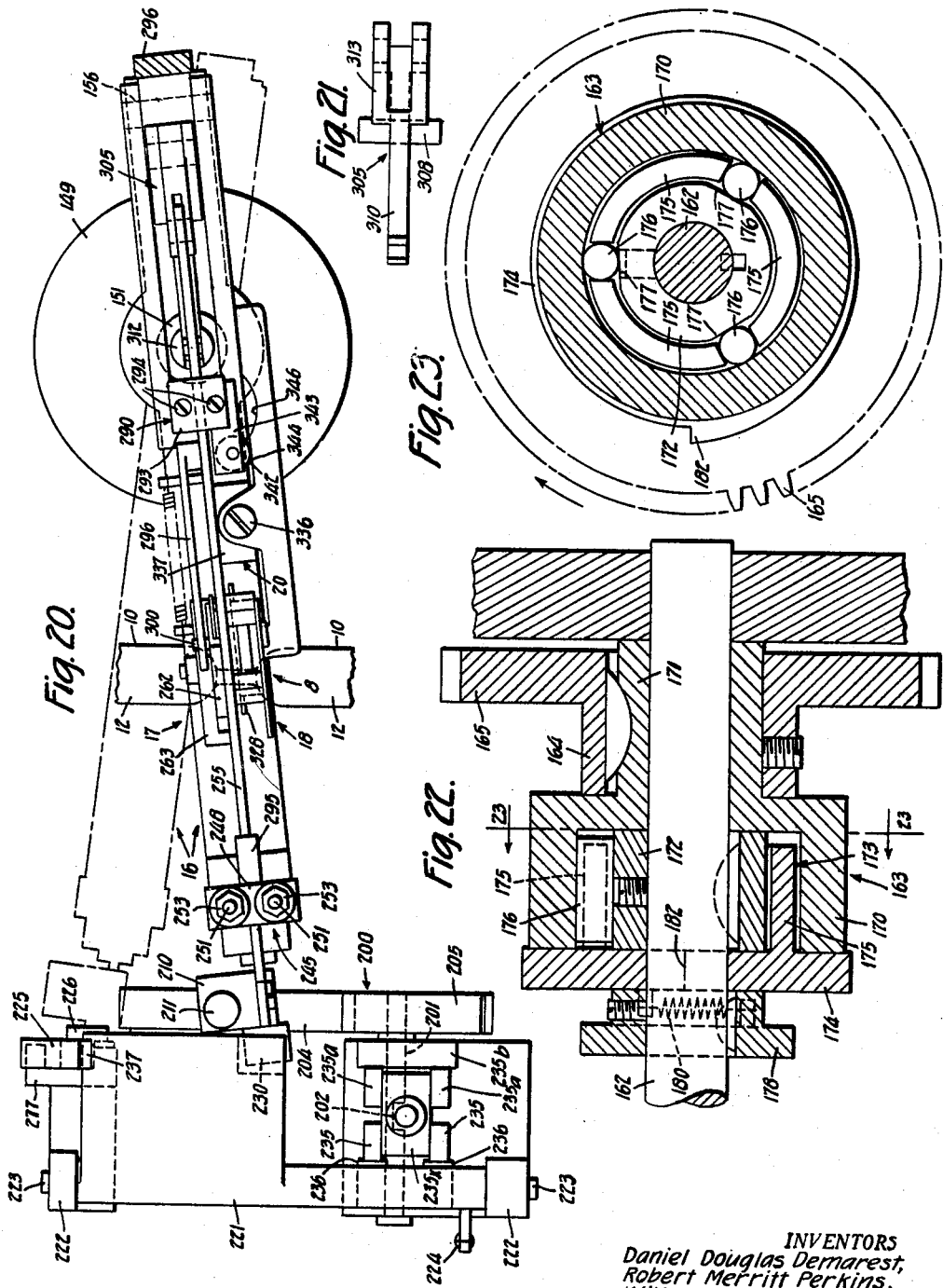

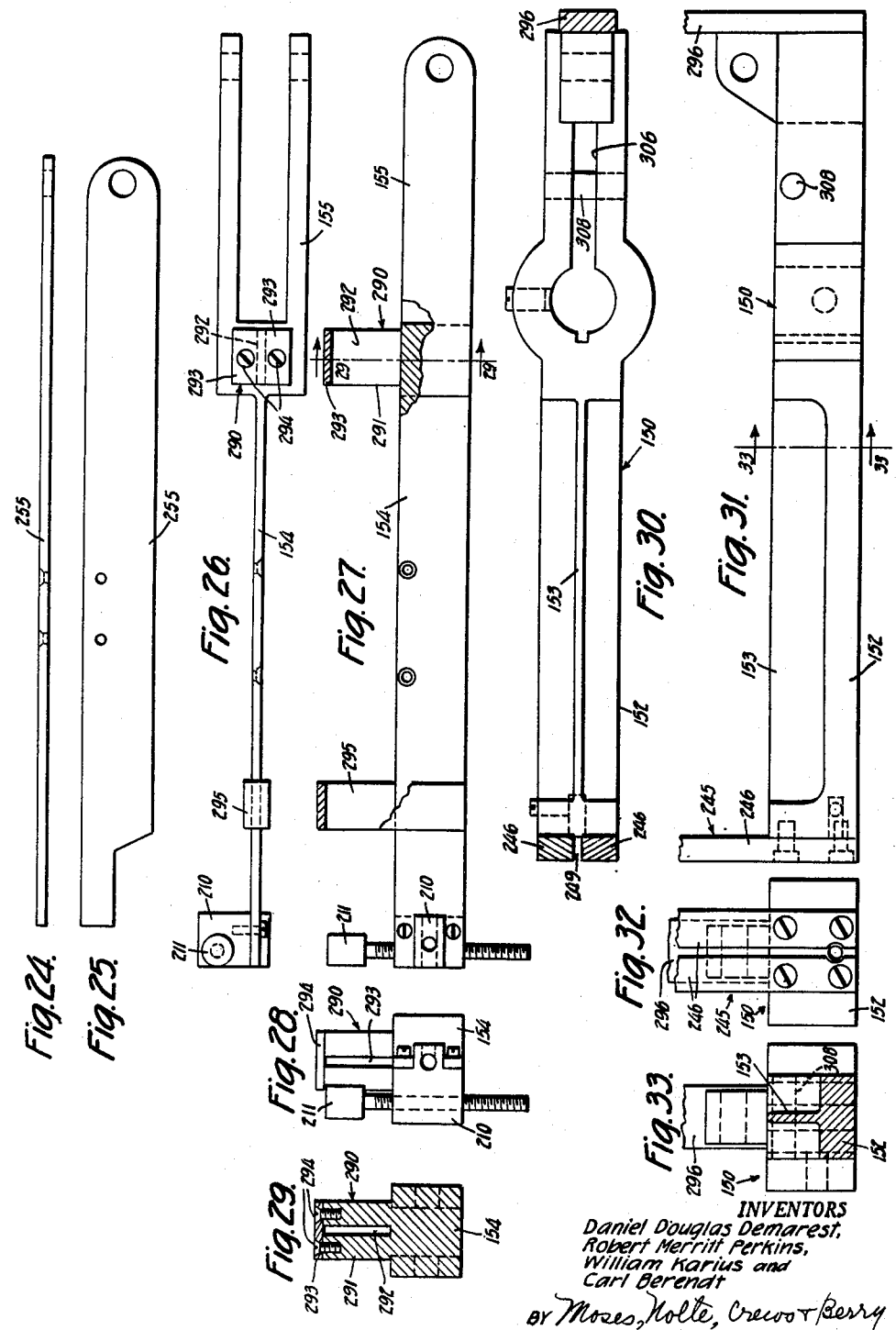

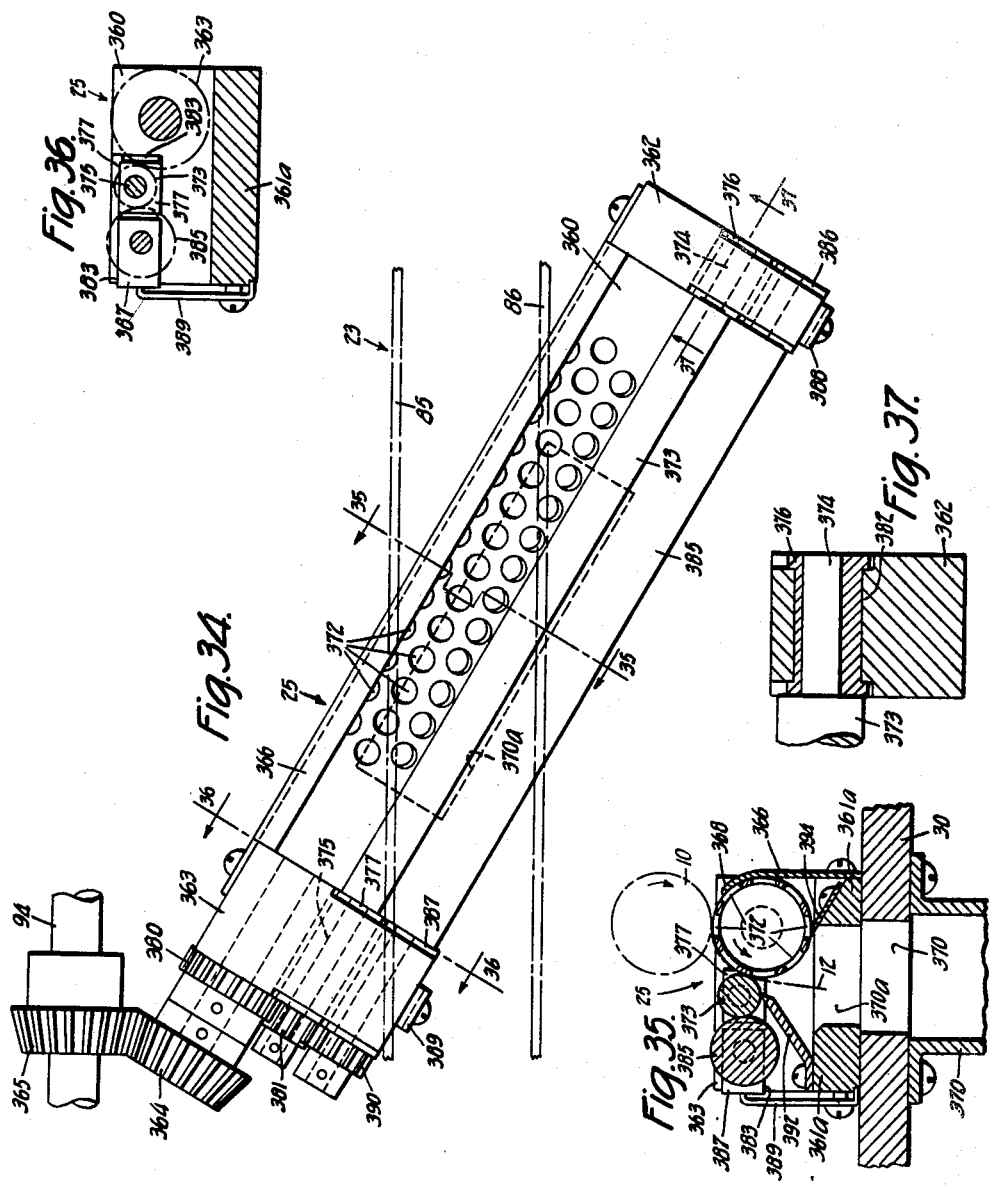
March 23, 1954  D. D. DEMAREST ET AL  2,672,649
METHOD FOR REMOVING CASINGS FROM SAUSAGES AND THE LIKE
Original Filed June 15, 1950  13 Sheets-Sheet 12
INVENTORS
Daniel Douglas Demarest,
Robert Merritt Perkins,
William Karius and
Carl Berendt
ATTORNEYS

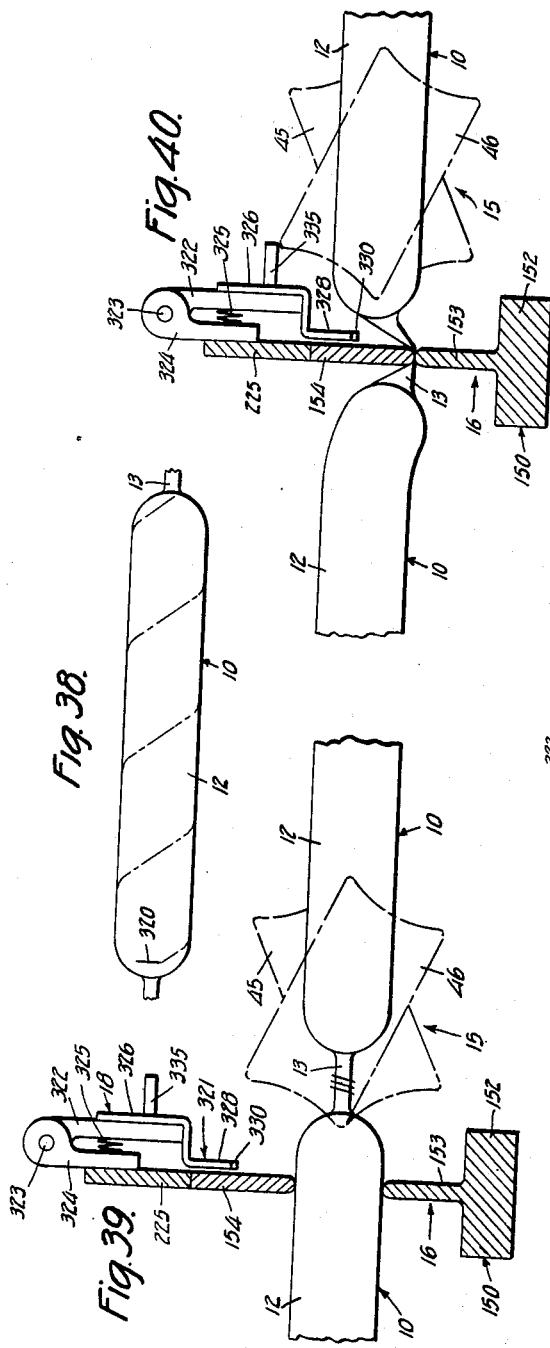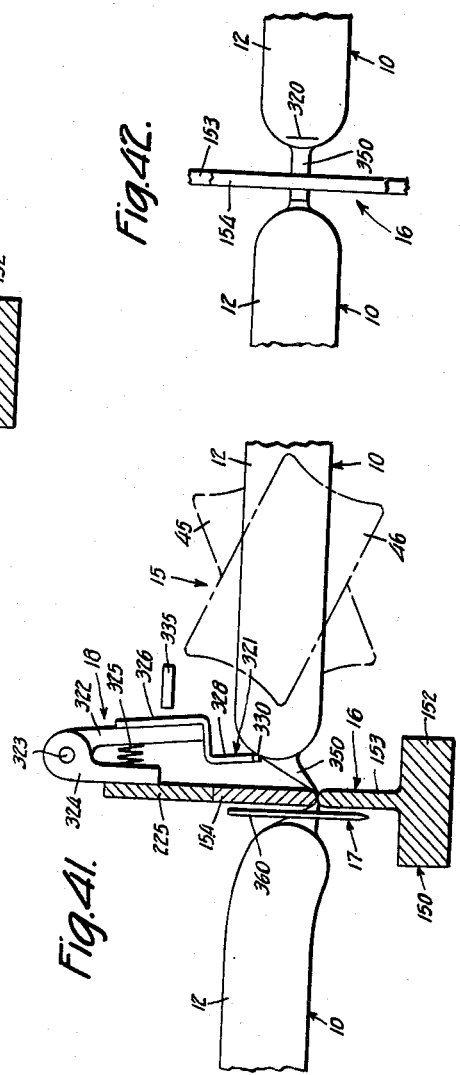

Patented Mar. 23, 1954

2,672,649

UNITED STATES PATENT OFFICE 2,672,649

METHOD FOR REMOVING CASINGS FROM SAUSAGES AND THE LIKE

Daniel Douglas Demarest, Port Washington, N. Y., and Robert Merritt Perkins, Upper Montclair, William Karius, Union, and Carl Berendt, Millburn, N. J., assignors to Linker Machines, Inc., Newark, N. J., a corporation of New York Original application June 15, 1950, Serial No. 168,324. Divided and this application June 12, 1953, Serial No. 370,898

11 Claims. (Cl. 17—45)

The present invention relates to the art of removing the casings or skins from such food products as sausages, frankfurters and the like.

Skinless food products such as frankfurters are produced by first filling a casing or skin of cellophane or other cellulosic or synthetic substances with minced meat or other minced foods, pinching or constricting the casing at spaced intervals to form the usual links or sections separated by ligatures or ties, cooking, smoking or processing these links while so encased and finally removing the casings. If the casing is removed manually, the operation is tedious, time consuming, costly and unsanitary. Machines have been proposed for this purpose, but these usually involve such operations as slitting the casing longitudinally or handling the food in such a way as to cut or otherwise mar the stuffing itself. Moreover, if these machines are provided with devices for severing the ligatures between the links, these are operated at predetermined preset intervals depending for accuracy of operation on the uniformity in the length of these links. If the length of the links is varied, the severing device must be manually reset to adapt itself to the new link length.

One object of the present invention is to provide a new and improved method of stripping a casing off a minced food product, such as a string of sausages or frankfurters, automatically, quickly, cleanly and without marring the product itself.

In carrying out certain method features of the present invention, the casing is removed from the stuffing by holding a tab section of the casing at the end of each link, and rotating the link with respect to said tab to cause said casing to be torn and peeled off the stuffing cleanly and in a helical strip.

As a further method feature, the casing is transversely slit partially near the end of each link and the ligature is severed to form the tab above referred to beyond the slit section of the casing.

Because the best means presently known of carrying out the method consists of certain novel mechanism, the invention is illustrated and described herein by reference to, and in connection with, such mechanism. No claim is made herein to the mechanism, the mechanism being claimed in Serial No. 168,324, filed June 15, 1950, for Apparatus for Removing Casings from Sausages and the Like, of which the present application is a division.

Other objects, features and advantages of the invention are apparent from the following particular description and from an inspection of the accompanying drawings, in which:

Fig. 1 is a top plan view of a sausage skinning machine embodying the present invention and showing the top cover outlined in dot and dash lines;

Fig. 1a is a detail section of the machine taken on lines 1a—1a of Fig. 1, but showing the top cover in section;

Fig. 1b is a detail section of the machine taken on lines 1b—1b of Fig. 1, but showing the top cover in section;

Fig. 2 is an enlarged side elevation of the sausage skinning machine;

Fig. 3 is a section of the machine taken approximately along the lines 3—3 of Fig. 2 and showing the machine at the instant the ligature between adjoining sausages has reached the feeler device controlling the operations of the ligature holding and severing devices and the device for partially slitting the skin transversely near the end of the sausage;

Fig. 4 is a section of the machine taken approximately along the lines 4—4 of Fig. 2;

Fig. 5 is a detail section of the machine taken approximately along the lines 5—5 of Fig. 2;

Fig. 6 is an enlarged detail section of the machine taken approximately along the lines 6—6 of Fig. 1;

Fig. 7 is a detail section of the machine taken approximately along the lines 7—7 of Fig. 2;

Fig. 8 is an enlarged section of the machine taken approximately along the lines 8—8 of Fig. 2 and shows the machine at the instant the ligature has reached the feeler device, but before the ligature severing knife has started to operate;

Fig. 9 is a detail section of the machine taken approximately along the lines 9—9 of Fig. 8, but shows the one-revolution clutch locking mechanism in released position to initiate the rotation of the clutch at the instant the ligature has reached the feeler device, and also the movement of the feeler device with the advancing sausage and the operations of the ligature clamping device, the ligature severing device and the skin slitting device controlled by said feeler device;

Fig. 10 is a detail section of the clutch locking mechanism similar to that shown in Fig. 9, but indicating said mechanism in clutch locking position;

Fig. 11 is a section of the machine similar to that shown in Fig. 8, but indicating the knife in position after severing the ligature between adjacent sausages;

Fig. 12 is an enlargement of the inactive ligature severing device shown in Fig. 8 and taken along the lines 12—12 of Fig. 13;

Fig. 13 is a top plan view of the ligature severing device;

Fig. 14 is a section of the ligature severing device taken along the lines 14—14 of Fig. 12;

Fig. 15 is an enlarged section of the machine taken approximately along the lines 15—15 of Fig. 2 and showing the ligature clamping device shifted in position to strip the end section of the ligature beyond the transverse slit and to form thereby a tab by which the entire sausage skin may be subsequently peeled off the sausage;

Fig. 16 is a detail section of the ligature clamping and skin slitting devices taken approximately along the line 16—16 of Fig. 15;

Fig 17 is a top plan view of the ligature clamping and severing devices shown in Fig. 16;

Fig. 18 is a section of the machine similar to that of Fig. 15, but showing the feeler device at the instant it has been released to permit the next sausage link to pass therethrough after completion of the ligature severing and tab forming operations;

Fig. 19 is a detail section of the latch device controlling the release of the feeler device and shown at the instant said latch device is tripped to release said feeler device;

Fig. 20 is a top plan view of the feeler device with associated ligature clamping and severing devices and tab forming device;

Fig. 21 is a top plan view of a bell crank forming part of the feeler device;

Fig. 22 is an axial section through the one-revolution clutch for operating the feeler device;

Fig. 23 is a section of the one-revolution clutch taken along the lines 23—23 of Fig. 22;

Fig. 24 is the top plan view of the top slide bar for operating the ligature severing knife;

Fig. 25 is a face view of the slide bar shown in Fig. 24;

Fig. 26 is a top plan view of the upper feeler and ligature clamping bar;

Fig. 27 is a face view of the upper feeler and ligature clamping bar;

Fig. 28 is an end view of the upper feeler and ligature clamping bar;

Fig. 29 is a section of the upper feeler and ligature clamping bar taken along the lines 29—29 of Fig. 27;

Fig. 30 is a top plan view of the lower feeler and ligature clamping bar;

Fig. 31 is a face view of the lower feeler and ligature clamping bar;

Fig. 32 is an end view of the lower feeler and ligature clamping bar;

Fig. 33 is a section of the lower feeler and ligature clamping bar taken along the lines 33—33 of Fig. 31;

Fig. 34 is a top plan view of the suction skin stripping device;

Fig. 35 is a transverse section of the suction skin stripping device taken along the lines 35—35 of Fig. 34;

Fig. 36 is a section of the suction skin stripping device taken along the lines 36—36 of Fig. 34;

Fig. 37 is an enlarged section of the suction skin stripping device taken along the lines 37—37 of Fig. 34;

Fig. 38 is a side view of the sausage link, the helical stripping line of the skin being shown in dot and dash lines;

Fig. 39 is a transverse section of the feeler device shown while it is engaging the sausage link;

Fig. 40 is a transverse section of the feeler device shown at the instant the ligature between adjoining sausage links has reached the feeler device;

Fig. 41 is a transverse section of the feeler device shown at the instant the knife has been moved into position to produce a partial transverse slit in the sausage skin near the end of the sausage link; and Fig. 42 is a top plan view of a sausage link showing the transverse slit in the skin near the end of said sausage.

GENERAL DESCRIPTION

The present invention is applicable to any food product and especially a minced meat product enclosed in a skin or casing in the general nature of ordinary sausages, frankfurters, wieners and the like. In the form shown, the machine is illustrated in its application to a string of conventional sausages and more specifically to frankfurters 10 (Fig. 1) comprisinng a boiled or otherwise cooked minced meat 11 (Fig. 3) stuffed in a tubular skin or casing 12 of cellophane or any other suitable material which must be removed before this meat is consumed. The meat casing 12 (Figs. 1, 39–42) is pinched at spaced sections to form ligatures or ties 13 between frankfurter links or sections.

The string of frankfurters 10 is moved continuously endwise along an entry trough or channel 14 (Figs. 1 and 2) by a first feed device 15 into the field of action of a feeler device 16. This feeler device 16 senses the arrival of a ligature 13 at a predetermined station and serves also as a ligature clamping device (Figs. 16, 39, 40 and 41). The feeler device 16 also serves to initiate and control the operation of a ligature severing device 17 (Figs. 11-14) a skin slitting device 18 (Figs. 15, 16, 39, 40 and 41) and a tab forming device 20 (Figs. 15 and 17) carried by said feeler device.

After the frankfurters 10 have been severed and a skin tab 21 (Fig. 17) formed at the advanced end of each frankfurter in the manner to be described, these frankfurters are moved endwise by a second feed device 22 (Fig. 1) and then along a way 23 by a third feed device 24 (Figs. 1 and 6) into the field of operation of a suction skin stripping device 25 (Figs. 1, 34–38). At the same time, the frankfurters are advanced into the field of operation of the skin stripping device 25, they are rotated by this third feed device 24, to cause the casing 12 to be neatly torn and peeled off the frankfurter as a helical strip, as shown in Fig. 38.

The machine more specifically comprises an elevated platform or bed plate (Figs. 1, 2 and 3) supported on frame pieces 31 and serving to support above it the trough or channel 14, the feeler device 16, the ligature severing device 17, the skin slitting device 18, the tab forming device 20, the feed devices 15, 22 and 24 and the skin stripping device 25.

Below the bed plate 30 is the drive and also the power transmission from this drive to these different devices. The power comes from an electric motor (not shown) or other suitable source and drives a pulley 33 (Figs. 2, 4 and 5) on a main drive shaft 34 through a belt 35. On this shaft 34 is a sprocket wheel 36 which drives at a reduced speed a larger sprocket wheel 37 on a countershaft 38 through a chain 40. This countershaft 38 serves to drive the three feed devices 15, 22 and 24.

THE FIRST FEED DEVICE 15

The first feed device 15 serves to move the string of frankfurters along the entry trough 14 towards the field of operation of the feeler device 16 and comprises a pair of feed rollers 45 and 46 (Figs. 1, 2 and 7) disposed on opposite sides of a frankfurter in feed engagement therewith. These feed rollers 45 and 46 are constructed and mounted to impart to the frankfurter engaged thereby not only endwise movement towards the feeler device 16, but also a partial rotary movement to render the advanced clamped end section of the skin or casing on said frankfurters taut for transverse slitting, as will be more fully described. To that end, the feed rollers 45 and 46 are secured to the upper ends of respective shafts 47 and 48 (Figs. 1, 2, 4 and 7) inclined in opposite directions with respect to the vertical and are peripherally grooved for conforming feed engagement with the frankfurters. The shaft 47 is journalled in a fixed bearing 50 fastened to the underside of the bed plate 30 and has secured to its lower end a worm gear 51 meshing with one side of a worm 52 on the countershaft 38. The other shaft 48 is journalled in a floating bearing 53 secured to a collar 54 (Fig. 2) supported for free rotary movement on the countershaft 38 and has secured to its lower end a worm gear 56 (Fig. 7) meshing with a worm 56a on shaft 38. The feed roller 46 is pressed against the frankfurter 10 and the frankfurter in turn is pressed against the other feed roller 45 by a spring 57 (Figs. 2 and 7) secured at one end to an arm 58 rigid with the bearing 53 and anchored at its other end to the underside of the bed plate 30. This spring 57 yieldably urges the entire unit 46, 48 and 53 clockwise (Fig. 7) about the countershaft 38.

THE SECOND FEED DEVICE 22

After the advanced end of a frankfurter 10 has been operated upon by the different mechanisms carried by the feeler device 16 as will be more fully described, ths frankfurter is picked up by the second feed device 22 and advanced towards the third feed device 24. This second feed device 22 comprises a pair of cylindrical feed rollers 65 and 66 (Figs. 1, 2, 3, 4 and 5) disposed on opposite sides of the frankfurter in feed engagement therewith and secured to the upper ends of respective vertical shafts 67 and 68. The shaft 67 is journalled in a fixed bearing 70 fastened to and depending from the bed plate 30 and has secured to its lower end a worm wheel 71 meshing with one side of a worm 72 on the countershaft 38. The other shaft 68 is journalled in a floating bearing 74 including two arms 74a, each arm having a hub 75 supported for free rotary movement on the countershaft 38 and has secured to its lower end a worm gear 76 meshing with the other side of the worm 72. The feed roller 66 is pressed against the frankfurter 10 and the frankfurter in turn is pressed against the other feed roller 65 by a spring 80 secured at one end to an arm 81 rigid with the bearing 74 and anchored at its other end to the underside of the bed plate 30. This spring 80 yieldably urges the entire unit 66, 68 and 74 clockwise (Figs. 3 and 5) about the countershaft 38.

THE THIRD FEED DEVICE 24

The third feed device 24 picks up the frankfurter which has been severed from the rest of the string and advances it along the way 23 at a speed greater than the speed of advancement of said string to effect its wider separation from said string. This feed device 24 also advances the severed frankfurter into the field of operation of the skin stripping device 25 (Figs. 1, 34-38), where the skin tab 21 (Fig. 17) formed at the advanced end of the severed frankfurter is suctionally taken hold of and at the same time said frankfurter is rotated to cause the skin or casing 12 thereon to be torn and stripped off as a helical strip, as shown in Fig. 38.

The feed device 24 comprises a set of parallel lower feed rollers 90 (Figs. 1, 5 and 6) on which the severed frankfurters 10 are adapted to rest as they advance along the guideway 23. This guideway 23 comprises guide plates 85 and 86 supported, respectively, by brackets 87 and 88. The guideway 23 is open at the bottom to permit the frankfurters to rest on the feed rollers 90. Each of these feed rollers 90 is secured to a shaft 91 journalled in a bearing 92 mounted on bed plate 30 and is inclined with respect to the course of the way 23, to cause the frankfurter to move endwise along said way and at the same time to rotate about its longitudinal axis.

For driving the lower feed rollers 90, each of the roller shafts 91 carries a bevel gear 89 meshing with a corresponding bevel gear 93 on a shaft 94. This shaft 94 is journalled in bearings 95 mounted on the bed plate 30 and carries a sprocket wheel 96 (Figs. 4 and 5) driven from the countershaft 38 through a transmission comprising a gear 97 on said countershaft meshing with a pinion 98 on a shaft 100 carrying a sprocket wheel 101 driving the sprocket wheel 96 through a chain 102.

The feed device 24 also comprises a set of parallel upper feed rollers 110 (Figs. 1, 1a, 5 and 6) resting on the frankfurters 10 as they advance along the way 23. Each of these feed rollers 110 is secured to a shaft 111 journalled in a bearing 112 fastened to the underside of a cover plate 113 and is inclined with respect to the course of the way 23 to cooperate with the lower feed rollers 90 in moving the frankfurters 10 endwise along said way and at the same time in rotating them about their longitudinal axis. This cover plate 113 is secured on one side to a pair of blocks 114 (Figs. 1, 1b and 2) supported on shaft 115, so that this plate is hinged about said shaft.

The shaft 115 is journalled in bearings 116 (Figs. 1 and 2) secured to the bed plate 30 and carries a series of bevel gears 117 (Figs. 1, 5 and 6) in mesh with bevel gear 118 respectively on the roller shafts 111 respectively to drive the feed rollers 110. A sprocket wheel 120 (Figs. 1, 2, 4 and 5) on this shaft 115 is driven from the countershaft 38 through a transmission comprising the gear 97 on said countershaft meshing with a pinion 121 on a shaft 122 carrying a sprocket wheel 123 driving the sprocket wheel 120 through a chain 124.

The cover plate 113 being freely hinged on the shaft 115, the upper feed rollers 110 carried by said plate rest on the frankfurters and thereby serve to maintain these frankfurters in proper feed engagement with said rollers and the lower feed rollers 90. The two feed devices 15 and 22 are adapted to operate effectively regardless of the length and diameter of the sausages being skinned and the floating mounting for the upper feed rollers 110 permits the third feed device 24 to adapt itself to sausages of the same variable size.

To limit the downward position of the cover plate 113 when no frankfurters are in the way 23, there is provided a block 130 (Figs. 1 and 1b) fastened to the bed plate 30 and serving as a stop for a hand screw 131 threaded into said cover plate.

After the frankfurters are advanced along the way 23 by the feed device 24 and after they have been successively skinned by the device 25, they are delivered on to a discharge channel or trough 132 for packaging or other dispensation.

FEELER DEVICE 16

The feeler device 16 (Figs. 3, 8, 11, 15, 16, 18, 20, 26–33, and 39–41) comprises a lower bar 150 with a hub keyed to the upper end of an upright shaft 151 for angular oscillatory movement about the axis of said shaft. This feeler bar 150 is supported on a bearing plate 149 between the base of said bar and the bed plate 30 and has a wide base 152 and a rib 153 serving as a rest for the frankfurters as they are moved through the sensing field of the feeler device.

Supported on the lower feeler bar 150 is an upper feeler bar 154 having a forked end section 155 pivotally secured to one end of said lower feeler bar by a pivot pin 156. This upper feeler bar 154 oscillates angularly with the lower feeler bar 150 about the axis of the shaft 151, but is free to swing edgewise up and down about the axis of the pivot pin 156.

During normal operating periods, the feeler bars 150 and 154 are in the angular position shown in Fig. 1 and in Fig. 20 in full lines. While in this angular position of the feeler bars 150 and 154, the upper bar 154 is in raised inclined position and the advanced frankfurter of the string of frankfurters is moving over the upper edge of the rib 153 with the inclined raised upper bar 154 resting on this advanced frankfurter, as shown in Fig. 39. As soon as the ligature 13 on the trailing end of this advanced frankfurter reaches the feeler bars 150 and 154, the raised upper feeler bar 154 drops by gravity on to said ligature and clamps it between said bars as shown in Figs. 3 and 40. This sensing action of the upper feeler bar 154 on the ligature 13 initiates the operation of the ligature severing device 17, the skin slitting device 18 and the tab forming device 20 carried by the feeler device 16. While these devices are operating, the feeler bars 150 and 154 clampingly hold the ligature 13 therebetween and at the same time move angularly in a horizontal plane about the axis of the shaft 151 from the position shown in full lines in Fig. 20 to the position shown in dot and dash lines, so that the frankfurters continue their movement. After the operations of these devices have been completed, the feeler device is angularly returned about the axis of the shaft 151 back into the position shown in full lines in Fig. 20.

To facilitate the angular movement of the feeler device 16 described, the lower feeler bar 150 carries at its outer end a wheel 157 adapted to ride over the bed plate 30. To effect the angular movement of the feeler device 16 described, the upright shaft 151 to which the lower feeler bar 150 is keyed is journalled in a bearing 160 affixed to and depending from the bed plate 30. This shaft 151 is rocked through the operation of a drum cam 161 (Figs. 2, 3 and 4) controlled by the sensing action of the feeler device 16. This cam 161 is mounted on a cam shaft 162 constituting the output or driven shaft of a one-revolution clutch 163 having an input or drive shaft 164 to which a gear 165 is secured. This gear 165 meshes with a gear 166 on the countershaft 38, so that the input shaft 164 of the one-revolution clutch 163 is driven continuously while the rotation of the drum cam 161 is initiated upon the ligature sensing action of the feeler device 16 and is continued for a single revolution. A follower arm 167 is secured at one end to the lower end of the shaft 151 and at its other end carries a follower roller 168 extending in the cam groove 169 of the drum cam 161, so that as this cam rotates, the arm 167 is oscillated and the feeler device 16 is swung about the axis of the shaft 151 through one complete cycle before coming to rest.

The one revolution clutch 163 is shown in Figs. 22 and 23 of the Hilliard type and comprises a drum 170 having a hub 171 which embraces the output cam shaft 162 with a free rotative fit and which is keyed to the gear 165. Keyed to this shaft 162 inside the drum 170 is a sleeve 172. Extending into the space between the peripheral wall of the drum 170 and the sleeve 172 is a cage 173 integral or otherwise rigid with a disc 174 mounted for free rotation on the shaft 162. Between the sections 175 of the cage 173 are rollers 176 seated on flats 177 on the periphery of the sleeve 172 and engaging the inner periphery of the peripheral wall of the drum 170. A collar 178 keyed on the shaft 162 has a pin and spring connection 180 with the lock disc 174 tending to rotate said disc clockwise (Fig. 23) to jam thereby the rollers 176 between the peripheral wall of the drum 170 and the sleeve 172 and to connect thereby said drum and said sleeve for rotation in unison.

The lock disc 174 is normally held against rotation by a pawl 181 (Figs. 2, 3 and 4) engaging a tooth 182 on said lock disc. This pawl 181 is operated and controlled from the feeler device 16 through a control rod 183 which extends with a slide fit through a guide sleeve 184 fastened to the lower face of the bed plate 30 and through a block or bracket 185 secured to the upper face of this bed plate, and which is urged axially downwardly through a coil spring 186. The axial movement of the control rod 183 is transmitted to the pawl 181, and for that purpose, this pawl constitutes one arm of a bell crank 187 mounted loosely on a shaft 190, the other arm 191 of said bell crank being connected to the lower end of the control rod 183 by being threaded into a block 191a. The block 191a has a shaft section 191b pivotally supported in the free end 191c of arm 191. A collar 191d is secured to the shaft section 191b to hold the block 191a on the arm 191. The lower end of the rod 183 extends through the block 191a and has threaded thereon a lock nut 191e. The spring 186 is confined between the guide sleeve 184 and the connecting block 191a.

During normal operations, i. e., when no ligature feeler impulse is active, the control rod 183 is locked in its uppermost position by means to be described, against the action of the spring 186 and the pawl 181 is in engagement with the tooth 182 on the lock disc 174 and locks thereby said disc against rotation. The clutch rollers 176 will be loose in the space between the drum 170 and the sleeve 172 and the drum will, therefore, rotate idly. When the control rod 183 is released, it snaps downward through the action of the spring 186 and this causes the pawl 181 to move out of engagement with the tooth 182 on the lock disc 174. This operation releases the lock disc 174 and causes the collar 178 through its pin and spring connection 180 to rotate the lock disc sufficiently to jam the rollers 176 between the drum 170 and the sleeve 172 and the shaft 162 to rotate. The rotation of the shaft 162 continues for one revolution. In the meantime, the pawl 181 moves into position by means to be described to engage the tooth 182 on the lock disc 174 when the disc has made one revolution and to hold said disc and in turn the shaft 162 against rotation, until the next feeler impulse from the feeler device 16 is received.

For moving the pawl 181 into position to engage the tooth 182 on the lock disc 174 when the disc has made one revolution, there is keyed to the shaft 162 a face cam 192 (Figs. 2, 3 and 4) having a cam groove 193 for a follower roller 194 mounted on one end of a follower arm 195, the other end of which is secured to the shaft 190. A dog 196 fastened to this shaft 190 has a catch or claw 197 underneath the bell crank arm 191 adapted to engage said arm and to start raising the lowered control rod 183, by the operation of the cam 192 on the shaft 190, soon after the clutch 163 is released.

For releasably locking the control rod 183 in raised position against the action of the spring 186, there is provided at latch device 200 (Figs. 3, 8, 9, 10, 15, 18 and 20) comprising a rock-shaft 201 journalled in the block 185 and having a hemicylindrical latch section 202 adapted to rock into and out of rod locking position in a recess 203 on one side of the control rod 183. For rocking the latch shaft 201, there is secured to one end of said shaft a lever 204 in the form of a plate urged in raised inclined position shown in Fig. 10 by a counterweight 205 secured thereto or by a spring if desired. In this raised position of the lever 204, the latch section 202 of the rock-shaft 201 is in the recess 203 of the raised control rod 183 and is in rotative position to lock said rod against the action of the spring 186 urging said rod downward.

To turn the rock shaft 201 in position to release the control rod 183 for downward movement, the end of the upper feeler bar 154 has connected thereto a block 210 (Figs. 8, 9, 20, 27 and 28) carrying an upright thumb screw 211 threaded therein and disposed directly above the lever plate 204. While this upper feeler bar 154 is in raised position (i. e., before the ligature has been sensed), the lever plate 204 is in raised position shown in Fig. 10, and the latch section 202 of the rock-shaft 201 connected to said lever plate is locking the control rod 183 in raised posiiton shown. As soon as a ligature reaches the upper feeler bar 154, this bar drops and at the same time the screw 211 engages the lever plate 204 and depresses it into the horizontal position shown in Fig. 9 against the action of the counterweight 205. This rotates the latch section 202 of the rock-shaft 201 into position to release the control rod 183, and permits it to move downward by the action of the spring 186. This releases the pawl 181 from engagewith the lock disc 174 and permits the clutch 163 to rotate the cam shaft 162 clockwise (Fig. 3) for one revolution as described. This in turn swings the feeler device 16 angularly about the axis of the upright shaft 151 through one cycle.

As the cam shaft 162 rotates clockwise (Fig. 3) for the first half revolution, the cam 192 rotates the shaft 190 clockwise and causes thereby the dog 196 on said latter shaft to raise the control rod 183 and the pawl 181 to move inwardly into disc locking position. At the same time, the feeler device 16 is swung about the axis of the shaft 151 and in a horizontal plane through the operation of the drum cam 161, from the extreme position shown in full lines in Figs. 1 and 20 to the position shown in dot and dash lines in Fig. 20.

As the cam shaft 162 continues the second half of its clockwise revolution (Fig. 3), the cam 192 rotates the shaft 190 counterclockwise and causes the dog 196 to be lowered. Since the control rod 183 has been raised by the previous operation during the first half of the revolution of the cam shaft 162, and since said control rod is locked in said raised position by the latch device 200 previously described, this lowering of the dog 196 has no effect on said control rod except to place said dog in position to permit lowering of the bell crank 191 when said control rod is released to move the pawl 181 for clutch release. The clockwise rotation of the shaft 190 during the first half of the cycle as described moves the pawl 181 in position to engage the tooth 182 on the clutch 174 when said disc has completed one revolution and to lock thereby said disc and in turn the clutch 163 against further operation upon completion of said revolution.

As the cam shaft 162 continues the second half of its clockwise revolution (Fig. 3), the drum cam 161 swings the feeler device 16 about the axis of the shaft 151 and in a horizontal plane back into the position shown in full lines in Figs. 1 and 20.

As the feeler device 16 moves clamped to the ligature angularly from the position shown in full lines in Figs. 1 and 20 to the position shown in dot and dash lines in Fig. 20, the ligature severing device 17, the skin slitting device 18 and the tab forming device 20 carried by said feeler device are operating and complete their operations by the time the feeler device reaches the angular position shown in dot and dash lines in Fig. 20. At that instant, the upper feeler bar 154 is released to swing upward about the axis of the pivot pin 156 by the action of a spring 220 (Fig. 18) acting on said feeler bar in a manner to be hereinafter described. The raising of the upper feeler bar 154 permits the advanced frankfurter of the string to pass between the two feeler bars 150 and 154 with this frankfurter resting on the lower feeler bar 150 and the upper feeler bar 154 resting on the frankfurter, while the feeler device 16 as a whole is returning to the position shown in full lines in Figs. 1 and 20 about the axis of the upright shaft 151.

To hold the upper feeler bar 154 down in ligature clamping position while the feeler device 16 as a whole is moving from the angular position shown in full lines in Fig. 20 to the angular position shown in dot and dash lines, there is provided above the bed plate 30 a holding plate 221 (Figs. 2, 3, 8, 9, 15, 18, 19 and 20) pivotally mounted on bearings 222 by means of a pivot shaft 223. This holding plate 221 is urged counterclockwise (Figs. 8 and 18) into open position about the axis of the pivot shaft 223 by means of a spring 224. A latch 225 pivotally supported at 226 on a bracket 227 is pressed by a spring 228 into engagement with the end of the holding plate 221 and restrains said plate in downward position shown in Figs. 8, 9 and 15. In this downward position of the holding plate 221, the upper feeler bar 154 is held down by said plate through the agency of a roller 230 rotatably carried by the block 210 at the end of said bar and adapted to ride underneath said holding plate in this downward position. The latch 225 is in the path of travel of the roller 230 as the feeler device 16 is swung angularly about the axis of the upright shaft 151 from the position shown in full lines in Figs. 1 and 20 to the position shown in dot and dash lines in Fig. 20. As the feeler device 16 reaches this extreme latter position, the roller 230 carried by the upper feeler bar 154 engages the latch 225 and moves it about the pivot axis at 226 to release the holding plate 221. The holding plate 221 is thereby permitted to swing open into the position shown in Fig. 18 by the action of the spring 224. This releases the upper feeler bar 154 for edgewise pivotal movement upward about the axis of the pivot pin 156 by the action of the spring 220, in a manner to be hereinafter described. At that instant, the lever plate 204 is raised into the angular position shown in Fig. 10 by the action of the counterweight 205, and the latch section 202 of the rock-shaft 201 is rotated in position to lock the raised control rod 183.

While the feeler device 16 as a whole is returning towards the position shown in full lines in Figs. 1 and 20, the upper feeler bar 154 moves from the full line position in Fig. 18 to the position shown in dot and dash lines when it rests on the advanced frankfurter. When the feeler device 16 reaches this position, it stays there, as shown in Fig. 39, until the next ligature reaches the feeler device. At that instant, the upper feeler bar 154 drops as shown in Figs. 3 and 40 and causes the ligature to be clamped between the two feeler bars 150 and 154, the spring 220 having been released, as in Fig. 3, thus permitting the bar 154 to drop freely. At the same time, the control rod 183 is released by the engagement of the screw 211 on the lever plate 204 and this causes the control rod to snap downward under the action of the spring 186.

As the control rod 183 moves downward, it brings the raised holding plate 221 downward into locked engagement with the latch 225 (Fig. 9). To that end, the upper end of the control rod 183 carries rollers 235 (Figs. 8, 9, 15, 18 and 20), on a head 235x, adapted to ride along crank arms 236 rigid with the hub of the holding plate 221 as said control rod moves downward and to cause thereby said plate to move downward into holding position shown in Figs. 8 and 9. While the rollers 235 are acting on the crank arms 236, rollers 235a, also supported by the head 235x, engage a post 235b on the bracket 185. This prevents binding of the bar 183 in bearing 184.

The end 236a (Fig. 9) of the holding plate 221 nearest the latch 225 is bevelled and the upper end 237 of the latch is correspondingly bevelled to cause said latch to be cammed outwardly in position to permit said plate to drop in holding position. In this position, the latch 225 snaps into locking engagement with the plate 221. While the holding plate 221 is in its released position (Fig. 18), the pawl 225 is arrested against a stop 236b (Fig. 9).

The other end 238 of the holding plate 221 is also bevelled and the lower surface 240 of said plate is low enough in dropped position of said plate to cause said surface to press downwardly upon the roller 230 carried by the upper feeler bar 154 as the feeler device 16 moves from the position shown in full lines in Figs. 1 and 20 towards the position shown in dot and dash lines in Fig. 20, and to cause thereby the ligature to be clamped firmly between the two feeler bars 150 and 154. The bevelling at the end 238 of the holding plate 221 frees the roller 230 against the pressure action of the holding plate 221 in extreme position of the feeler device 16 shown in full lines in Figs. 1 and 20 and serves to cam the roller downward as this roller moves along said plate.

As the upper feeler bar 154 is released from restrained engagement with the holding plate 221, it swings edgewise about the axis of the pivot support 156 by the action of the spring 220, as shown in Fig. 18 and as already described, the spring 220 having previously been loaded in a manner hereinafter described. To absorb the shock of this instantaneous movement of the feeler bar 154, to limit the extent of this swinging movement and to guide the upper feeler bar 154 in this swinging movement, there is provided a bumper device 245 (Figs. 2, 8, 18, 31 and 32) comprising a pair of upright parallel bars 246 secured to the outer end of the lower feeler bar 150 and spaced from each other to define a guide space 249 therebetween. At the upper end of these bars 246 is a bumper sleeve 247 comprising a pair of metal plates 248 connected together by a block 250 of material such as leather. This bumper sleeve 247 is slidable along a pair of rods 251 secured to the upper ends of the bars 246 and is yieldably held downward against the upper shoulder ends of these bars by coil springs 252 bearing against washers and nuts 253 on said rods.

The upper feeler bar 154 passes through the guide space 249 between the bars 246 and slides therealong as it swings about its pivot support 156. A knife actuating bar 255 to be subsequently described rests on the upper feeler bar 154 and moves with this upper feeler bar when it swings upwardly. This knife actuating bar 255 strikes the bumper sleeve 247 absorbing the shock and limiting swinging movement.

THE LIGATURE SEVERING DEVICE 17

The ligature severing device 17 comprises a rotary knife 260 (Figs. 8 and 11-14) carried by the upper feeler bar 154 and operated by the bar 255 in the manner to be described. This knife 260 is in the form of a long blade having a bevelled ligature cutting edge 261 at one end and retained in holder 262 supported for rotary oscillatory movement in a bearing 263 fastened to the upper feeler bar 154 by screws 264. A shaft 259 secured to the holder 262 is journalled in the bearing 263.

The holder 262 has a recess 265 for receiving the knife 260 and has a pin 266 in said recess with a head adapted to pass freely through a circular opening 267 in said knife in the process of assembly and with a shank adapted to be retained in a neck extension 268 of said opening in assembled position. A pin 269 secured to the holder 262 in its recess 265 passes through a corresponding hole in the knife 260.

The bearing 263 is in the form of a block having a recess 271 with the ends flaring to form bevelled limiting shoulders 272, 273, 274 and 275 and a constricted circular bearing section 276. The knife holder 262 has a circular section 277 journalled in said bearing section and straight aligned end sections defining straight edges 281 and 282 adapted to engage limiting recess shoulders 272 and 273 respectively, in inoperative rotative position of the knife 260, as shown in Fig. 12 and defining straight edges 283 and 284 adapted to engage limiting recess shoulders 274 and 275, respectively, in extreme operative position of said knife.

The bearing 263 supports the knife holder 262 against the face of the upper feeler bar 154 and against the face of the knife actuating bar 255, so that said holder is retained between said bar faces and said bearing, but is permitted to rock therein.

The knife 260 is retained in the rotative inoperative limiting position shown in Fig. 12 by a spring 286 secured at one end to a pin 286a on the holder 262 and at its other end to the upper feeler bar 154.

The ligature severing knife 260 is actuated by the bar 255 resting edgewise on the upper feeler bar 154 and slidable therealong. This bar 255 is connected to the feeler bar 154 for edgewise angular movement therewith about the axis of the pivot support 156 and is guided for longitudinal movement therealong by means of a guide 290 (Figs. 11, 26, 27, 28 and 29) comprising an upward block extension 291 on said feeler bar at the base or inner end of its forked section 155 provided with as lot 292 which slidably receives said bar 255 and which is closed at its upper end by a plate 293 fastened to said extension by screws 294. Integral or otherwise rigid with the upper feeler bar 154 near its outer end section is a second guide clamp 295 for the bar 255.

A post 296a secured to one end of the lower feeler bar 150 serves as an anchor for one end of the spring 220, the other end being secured to the upper edge of the knife actuating bar 255. This spring 220 comprises a series of spring units hooked together to permit it to become easily slackened during certain phases of operation to be described and serves to snap the bars 154 and 255 into open position about the axis of the pivot support 156, when the feeler device 16 has been released in the position shown in dot and dash lines in Fig. 20. The bar 255 passes through the space between the guide bars 246 and is acted upon by the bumper 245 when the bars 154 and 255 are snapped as a unit into open position.

The bar 255 carries an arm 296 (Figs. 11-14) pivoted thereto at 297 and having a notch 298 receiving a pin 300 secured to the knife holder 262. This arm 296 is urged counterclockwise (Fig. 12) into catch engagement with the pin 300 by a spring clip 301 anchored at one end to said bar and bearing at its other end against a pin 302 on said arm.

When the knife actuating bar 255 is moved endwise along the upper feeler bar 155 towards the left (Fig. 12) after the ligature has been clamped between the ligature feeler bars 150 and 154, the arm 296 is moved therewith in the same direction, and this causes the knife holder 262 to be rotated counterclockwise about the axis of its bearing support into the position shown in Fig. 11. This results in the knife 260 moving into position to cut the clamped ligature. At this point, the pin 286a engages the arm 296 and continued motion of bar 255 causes said arm to turn clockwise lifting the notch 298 out of engagement with the pin 300 permitting spring 286 to return knife holder 262 instantly to the position shown in Fig. 12. This is necessary as otherwise the point of knife 260 would protrude below the bar 154 during the return movement of bar 255 and injure the frankfurter when bar 154 was lowered onto it.

As the knife actuating bar 255 returns endwise towards the right (Fig. 12), the notch 298 on arm 296 then reengages the pin 300, as shown in Fig. 12.

For moving the bar 255 endwise along the upper feeler bar 155, there is provided a bell crank 305 (Figs. 11 and 21) extending in a recess 306 in the lower feeler bar 150 and pivotally supported therein by a pin 308. One arm 310 of this bell crank 305 has a cleft pin and slot connection 311 with the upper end of an upright rod 312, the upright shaft 151 controlling the angular movement of the feeler device 16 in a horizontal plane being hollow, and said rod 312 being retained and guided therein for endwise movement. The other arm 313 of the bell crank 305 passes through the gap between the legs of the forked end section 155 of the upper feeler bar 154 and is connected to one end of the knife actuating bar 255 by a link 315 pivotally connected at its ends.

The rod 312 for controlling the endwise movement of the knife actuating bar 255 is actuated from the face cam 192 (Fig. 3) through the shaft 190. To that end, there is keyed or otherwise secured to this shaft 190 rocked by the face cam 192 a crank arm 316 having a cleft pivotal connection 317 with the lower end of the rod 312.

As the cam shaft 162 starts to rotate after receiving a ligature feeler impulse and after the one-revolution clutch 163 has been released as a result of said impulse, the rod 312 starts to be moved downward by the action of the shaft 190 rocked from the face cam 192, and this causes the knife actuating bar 255 to be moved endwise towards the left (Figs. 8 and 12) from the inactive position shown in Figs. 8 and 12 through the bell crank and link connections 313 and 315 to the ligature cutting position shown in Fig. 11.

SKIN SLITTING DEVICE 18

After the ligature between the advanced frankfurter and the next frankfurter of the string has been clamped between the feeler bars 150 and 154 and while the feeler device 16 is moving in a horizontal plane about the axis of the upright shaft 151 from the position shown in full lines in Figs. 1 and 20 towards the position shown in dot and dash lines in Fig. 20, a small transverse slit 320 (Fig. 42) is formed in the skin or casing 12 near the advanced end of this next frankfurter by the slitting device 18 preliminary to the formation of a skin stripping tab. This slitting device 18 comprises a slitting knife 321 (Figs. 3, 15, 16, 17, 20, 39, 40 and 41) secured to a holder 322 which pivotally hangs by a pivot connection 323 from a bracket 324 secured to the knife actuating bar 255 and which is urged into slitting position by a spring 325 between said holder and said bracket. The slitting knife 321 has an upper section 326 secured to the holder 322 by a releasable connection 327 of the same type by which the ligature severing knife 260 is mounted on its holder 262, and has a lower section 328 angularly offset from said upper section to permit it to slit the skin 12 near the advanced tip of the frankfurter just above the center thereof, and serrated at its lower cutting edge 330.

The slitting knife 321 moves with the knife actuating bar 255 and as said bar is moved endwise along the upper feeler bar 154 in the manner described, this knife is moved angularly about its pivot support 323 towards and away from skin slitting position. To that end there is provided a rail 335 pivotally secured by means of a pivot screw pin 336 to a block 337 fastened to the knife actuating bar 255 by screws 338. This rail 335 has a section 340 at one end engaging the upper section 326 of the slitting knife 321 and a section 341 at the other end which engages a roller 342 on a bracket 343 fastened to the guide clamp 290 and which is provided with straight edges 344 and 345 and with a circular notch 346 between said edges for the purpose to be described.

As the knife actuating bar 255 moves endwise towards the left (Fig. 15) along the upper feeler bar 154 it carries the rail 335 with it, and the engagement of the straight edge 344 of said rail with the roller 342 holds said rail in position to hold the slitting knife in the inactive position shown in full lines in Fig. 16. As soon as the rail notch 346 reaches the roller 342, the rail 335 is free to swing about the pivot pin 336, so that the slitting knife 321 is permitted to swing outward by the action of the spring 325 in position to slit the skin. As the notched section 346 of the rail 335 moves along the roller 342, the released slitting knife 321 moves along the skin of the frankfurter and forms the slit 320 (Fig. 42) therein. As the notched section 346 of the rail 335 moves past the roller 342 and the straight edge 345 of said rail moves into engagement with said roller, as shown in Fig. 17, the rail is turned about the pivot pin 336 and the slitting knife 321 is restored thereby into inactive position shown.

The frankfurter next to the advanced frankfurter of a string is supported on a roller 347 (Figs. 3 and 16) secured on a bearing block 348 fastened to the rib 153 of the lower feeler bar 150, as shown in Figs. 3 and 15. As this next frankfurter is being fed through the feeler 16 by the feed rollers 45 and 46 from the position shown in Fig. 39 to the position shown in Fig. 41, it is rotated about one-quarter revolution. After the ligature at the leading end of this next frankfurter has been clamped between the feeler bars 150 and 154, as shown in Fig. 41, the continued rotation of this frankfurter by the feed rollers 45 and 46 puts the skin 12 at this end of the frankfurter under tension preparatory to the slitting operation. This skin tensioning operation serves to hold the skin 12 taut for effective slitting.

After the skin 12 has been slit as described, there extends between the slit 320 and the clamped section of the ligature an appendage 350 (Figs. 16, 17 and 41). This appendage 350 is pulled in the manner to be described, to tear the skin beyond the slit 320 and to form the tab 21 by which the skin 12 can be held by the skin stripping device 25 and said skin can be helically torn and stripped off the frankfurter, while said frankfurter is being rotated. To form this tab 21, the block 337 pivotally supporting the rail 335 is constructed and located to engage the leading end of the frankfurter on which said tab is to be formed as said block moves to the left (Figs. 15 and 17) as the result of the corresponding movement of the knife actuating bar 255 endwise towards the left along the upper feeler bar 154. This frankfurter for the purpose is engaged by the edge 352 of the block 337, this edge being rounded to prevent it from cutting into the frankfurter.

As a result of the action of the block 337 on the frankfurter, the section of this frankfurter beyond the feed rollers 45 and 46 is bent as shown in Figs. 15 and 17, while the clamped ligature is retained in position between the feeler bars 150 and 154. This puts the appendage 350 under tension and causes said appendage to be torn beyond the slit 320 to form the tab 21.

SKIN STRIPPING DEVICE 25

The skin stripping device 25 which strips the skin 12 helically off the frankfurter as this frankfurter is advanced along the way 23 by the lower feed rollers 90 and by the upper feed rollers 110, comprises a hollow suction drum 360 (Figs. 1, 34–37) disposed at the level of the lower feed rollers 90 somewhat midway of the series of said rollers 90 and parallel to said feed rollers 90. This drum 360 supports the frankfurter as it is fed along the way 23 and is mounted in a housing 361 comprising a base 361a, bearing blocks 362 and 363 supported on and fastened to said base. This base 361a is secured to the bed plate 30. Journals at the ends of the drum 360 turn in the bearing blocks 362 and 363, respectively, one of these journals carries a bevel gear 364 beyond the bearing block 362 meshing with a bevel gear 365 on the shaft 94 to turn the drum 360.

The housing 361 also comprises a plate 366 extending between the blocks 362 and 363 and secured thereto, as for example, by screws 367. The upper section 368 of this housing plate 366 is curved around and is in contact with the periphery of the drum 360.

The interior of the drum 360 is maintained under vacuum, and for that purpose the bed plate 30 and the base 361a have registering openings 370 and 370a respectively, communicating with the interior of the housing 361 and secured to this bed plate below this opening is a conduit 371 leading to a suitable source of vacuum, such as a suction chamber (not shown) into which the skin strippings are also deposited. The drum 360 has a series of openings 372 through which the interior of said drum may be maintained under vacuum by communication with the suction conduit 371.

For pulling the tab 21 on the frankfurter for stripping action as said frankfurter is fed along the way 23 by the feed rollers 90 and 110, there is provided a feed roller 373 in tab feeding engagement with the suction drum 360 having end journals 374 and 375 supported for turning in bearings 376 and 377, respectively, and driven by a gear 380 on one of said journals meshing with a gear 381 on the journal 375 of the feed roller 373. These bearings 376 and 377 are slidably mounted in respective recesses 382 and 383 of the bearing blocks 362 and 363, respectively, supporting the suction drum 360.

For yieldably pressing the feed roller 373 against the suction drum 360, there is provided a pressure roller 385 having journals turning in bearings 386 and 387, respectively, which slide in the respective recesses 382 and 383 of the bearing blocks 362 and 363. This pressure roller 385 is pressed against the feed roller 373 by upright spring leaves 388 and 389 secured at their lower ends to the bearing blocks 362 and 363, respectively, and bearing at their upper free ends against the slide bearings 386 and 387, and is rotated by a gear 390 on one of its journals meshing with the gear 381 on the journal 375 of the feed roller 373. The bearings 376, 377, 386 and 387 supporting the rollers 373 and 385 are dimensioned so that they do not block the movements of these rollers towards and away from the suction drum 360 and towards and away from each other.

To prevent the skin strippings from the frankfurter from being carried too far around the feed roller 373, there is provided a scraper 392 between the bearing blocks 362 and 363 secured to the base 361a and having its scraping edge adjacent to the periphery of said feed roller. This scraper 392 serves not only for the purpose indicated, but serves also as a side wall of the housing 361 to seal said housing against air leakage therein.

A similar scraper 394 secured to the base 361a has its scraping edge adjacent to the periphery of the suction drum 360 to prevent the skin strippings from the frankfurter from being carried too far around said drum.

In operation, the leading frankfurter severed from all the others and having the skin tab 21 on the advanced end thereof, is fed along the way 23 by the feed rollers 90 and 110 at a speed great enough to separate sufficiently this frankfurter from the trailing frankfurters. As this skin tab 21 reaches the suction drum 360, it is held to the periphery thereof by the suction in said drum and is carried thereby around said periphery as said drum rotates counterclockwise (Fig. 35). While the frankfurter is being advanced endwise, it is at the same time being rotated in the opposite direction clockwise (Fig. 35). The tab 21 is fed by the suction drum 360 into a bite between the drum and the feed roller 373 and the skin 12 is thereby stripped off the frankfurter cleanly and in a helical manner, as shown in dot and dash lines in Fig. 38. The skin strippings are fed between the suction drum 360 and the feed roller 373 and into the housing 361 and then through the openings 370a and 370 of the bed plate 30 into the suction conduit 371 to a collection or disposal station (not shown). The slidable mount for the pressure roll 373 permits said roll to yield according to the thickness of the skin strippings between said roll and the suction drum 360.

The frankfurters cleanly stripped of their skins 12 as described are continued along the way 23 by the feed rollers 90 and 110 and are then delivered on to the discharge channel or trough 132 for packaging or other dispensation.

OPERATION

Although the operation of the machine has been made apparent, it is herein summarized.

While the feeler device 16 is in the regular position shown in full lines in Figs. 1 and 20, the upper feeler bar 154 is raised and resting on the frankfurter 11 as in Fig. 18, and the leading frankfurter is being fed by the feed rollers 45 and 46 through said feeler device as shown in Fig. 39. During this phase, the one-revolution clutch 163 (Figs. 2, 3, 22 and 23) is locked by the pawl 181, the control rod 183 is locked in raised position by the latch device 200, and the ligature severing device 17 (Figs. 11–14), the skin slitting device 18 (Figs. 15, 16, 39, 40 and 41) and the tab forming device 20 are inactive. At the same time, the rod 312 (Fig. 3) is in its raised position, and the knife actuating bar 255 is, therefore, in extreme right-hand position.

As soon as a ligature 13 between the leading frankfurter of the string and the next frankfurter reaches the feeler device 16, the upper feeler bar 154 drops as shown in Fig. 40 clamping thereby said ligature between the two feeler bars 150 and 154. This operation causes the screw 211 (Figs. 3, 8, 9 and 10) carried by the upper feeler bar 154 to engage the lever 204 of the latch device 200 and causes thereby the latch section 202 of the rock-shaft 201 to rotate in position to release the control rod 183. The released control rod 183 moves downward through the action of the spring 186 into the position shown in Fig. 3 and causes the pawl 181 to move out of engagement with the tooth 182 of the lock disk 174 of the one-revolution clutch 163, as shown in Fig. 3. This initiates rotation of the cam shaft 162 clockwise (Fig. 3) and causes rotation of the drum cam 161 and the face cam 192 secured thereto. For the first half revolution of the shaft 162, the shaft 151 to which the feeler device 16 is secured is rotated by the drum cam 161 and the follower arm 167 in a direction to swing the feeler device in a horizontal plane about the axis of said shaft from the position shown in full lines in Figs. 1 and 20 to the position shown in dot and dash lines in Fig. 20 at a speed corresponding to the speed of endwise movement of the string of frankfurters. At the same time, the face cam 192 through the dog 196 and the bell crank arm 191 raises the control rod 183 into position to engage later the latch 200 (Fig. 10) and to be locked thereby, and also moves the pawl 181 inwardly in position to engage the tooth 182 on the lock disc 174 upon completion of the revolution.

As the feeler device 16 moves about the axis of the shaft 151 from the position shown in full lines in Figs. 1 and 20 to the position shown in dot and dash lines in Fig. 20, the operation of the ligature severing device 17, the skin slitting device 18 and the tab forming device is initiated and completed.

In the operation of the ligature severing device 17, while the feeler device 16 is in the position shown in full lines in Fig. 20, the rod 312 is in raised position shown in Figs. 3 and 8, and the knife actuating bar 255 is in the extreme right hand position shown in Figs. 3, 8 and 11. As the cam shaft 162 (Fig. 3) rotates clockwise, the rod 312 is brought down through the operation of the face cam 192 and follower cam connections 195 and 316 and the knife actuating bar 255 is moved endwise towards the left by the bell crank and link connection 305, 315 into position shown in Fig. 11. This causes the knife holder 262 to be rotated counterclockwise about the axis of its bearing support by the action of the arm 296 carried by the knife actuating bar 255. This results in the knife 260 moving into position to cut the ligature clamped between the feeler bars 150 and 154, as shown in Fig. 11.

By the time the feeler device 16 reaches the extreme position shown in dot and dash lines in Fig. 20, the ligature severing device 17 will have completed its severing operation. The return movement of the feeler device 16 from the extreme position shown in dot and dash lines in Fig. 20 to the extreme feeler position shown in full lines in Figs. 1 and 20, during the second half of the revolution of the cam shaft 162 (Fig. 3) is accompanied by the upward movement of the rod 312 through the operation of the face cam 192, and this results in the return endwise movement of the knife actuating bar 255 towards the right (Figs. 3, 8 and 11) into the inactive position shown in Fig. 12.

While the feeler device 16 is in the extreme feeler position shown in full lines in Figs. 1 and 20, the skin slitting device 18 is in the inactive position shown in full lines in Figs. 16 and 40. As the feeler device 16 is moved towards the other extreme position shown in dot and dash lines in Fig. 20, the knife actuating bar 255 is moved endwise towards the left (Figs. 15 and 17) as described, the rail 335 carried by said bar 255 rides along the roller 342 and keeps the skin slitting knife 321 in inactive position shown in Fig. 16 in full lines until the notch 346 on said rail reaches said roller. This permits the rail 335 to turn counter-clockwise (Fig. 17) about its pivot support 336 and releases the knife 321 for outward pivotal movement under the action of the spring 325 into engagement with the skin 12 near the end of the frankfurter, as shown in dot and dash lines in Fig. 16 and as shown in Fig. 41, to form the transverse slit 320 (Fig. 42) in said skin.

As the feeler device 16 continues its movement towards the extreme position shown in dot and dash lines in Fig. 20, and the knife actuating bar 255 continues its endwise movement towards the left, the straight edge 345 of the rail 335 rides into engagement with the roller 342 and the rail is thereby turned to move the slitting knife 321 away from the frankfurter slit into inactive position shown in Fig. 17. At the same time, the edge 352 of the block 337 of the tab forming device 20 engages the side of the frankfurter and bends it as shown in Fig. 17 to place the severed appendage 350 (Fig. 41) of the skin 12 under tension and to form a skin tab 21 beyond the slit 320 (Fig. 42), as shown in Figs. 15 and 17.

As the feeler device 16 reaches the extreme position shown in dot and dash lines in Fig. 20, the roller 230 (Fig. 8) carried by the upper feeler bar 154 and riding under the holding plate 221, engages the latch 225 as shown in Fig. 19 and releases said holding plate. This causes the holding plate 221 to swing upwardly into the position shown in Fig. 18 by the action of the spring 224, and causes the knife actuating bar 255 and the upper feeler bar 154 to swing edgewise in unison about the pivot support 156 against the bumper sleeve 247 under the action of spring 220 as shown in full lines in Fig. 18. This will release the tab 21 on the forward end of the leading frankfurter of the string from the clamping action of the feeler bars 150 and 154 and will permit this frankfurter to pass into the field of the feed device 22 and between the feeler bars 150 and 154. The knife actuating bar 255 moves towards the right reducing the tension on the spring 220 and the upper feeler bar 154 then drops onto this frankfurter as shown in dot and dash lines in Fig. 18 and rides along said frankfurter, while the feeler device 16 is returning towards the position shown in full lines in Figs. 1 and 20 and while this frankfurter continues its endwise movement. When the feeler device 16 reaches the extreme position shown in full lines in Figs. 1 and 20, it stays there as shown in Fig. 39, until the next ligature reaches said feeler device.

During the movement of the feeler device 16 toward the extreme position shown in dot and dash lines in Fig. 20, the control rod 183 is raised as previously described and when said feeler device reaches this position, the edgewise movement of the upper feeler bar 154 about the pivot support 156 as described, causes the latch 200 to be turned into the rod locking position shown in Fig. 10. Therefore, during the return movement of the feeler device 16 towards the position shown in full lines in Figs. 1 and 20, the rod 183 is retained in the raised position and the pawl 181 is inward in position to stop the clutch 163 at the end of the revolution.

When the next ligature reaches the feeler device 16 in the extreme position shown in full lines in Figs. 1 and 20, the upper feeler bar 154 moving downward onto said ligature, operates the latch 200 in position to release the control rod 183 for downward movement and to initiate thereby the rotation of the cam shaft 162 (Fig. 3) as previously described. As the control rod 183 moves downward under the action of the spring 186, the roller 235 carried by said rod engages the crank 236 rigid with the holding plate 221 and moves said plate downward upon the roller 230 carried by the upper feeler bar 154. This plate 221 thereby maintains firm clamping engagement of the upper feeler bar 154 with the ligature, while the feeler device 16 is moving towards the position shown in dot and dash lines in Fig. 20.

The leading frankfurter which has just been severed from the rest of the string and which has the tab 21 at its leading end is carried by the feed device 24 along the way 23 at a speed greater than the speed of the string of frankfurters, to separate the severed frankfurter from said string by a wide gap, as shown in Fig. 1. At the same time, this severed frankfurter is rotated by the feed device 24.

As soon as the severed frankfurter reaches the suction drum 360 shown in Figs. 1 and 34-37, the tab 21 on the leading end of this frankfurter is held against the periphery of said drum by the suction therein and carried around thereby between the feed roller 373 and said drum into the housing 361. At the same time, the frankfurter rotating in a direction opposite to the direction of rotation of the drum 360 and moving endwise along the way 23 causes the skin 12 to be torn off the frankfurter helically in a neat clean fashion, as shown in Fig. 38, until the frankfurter is entirely skinned. The skinless frankfurter continues along the way 23 onto the trough 132 for packaging or other required dispensation.

It should be noted that the machine is adapted to operate on sausages or similar stuffed products of varying diameters and lengths and varying spaces between them with equal accuracy, without the necessity of adjustments.

In the following claims, reference to a "sausage" is made. It must be understood that this term is intended to be broad enough to include any food product stuffed in a tubular casing in the nature of a sausage, frankfurter, wiener or the like.

While the invention has been described with particular reference to a specific embodiment, it is to be understood that it is not to be limited thereto, but is to be construed broadly and restricted solely by the scope of the appended claims.

What is claimed is:

1. A method of skinning a sausage, which comprises rotating the sausage about its longitudinal axis, while holding a part of the skin against rotative movement with the sausage, to cause said skin to be torn off said sausage circumferentially, and at the same time moving the sausage endwise to cause said skin to be torn off and stripped from the sausage helically.

2. A method of skinning a sausage, which comprises moving a sausage endwise while rotating it, and at the same time pulling off a tab section of the skin from the sausage in a direction opposite to the direction of rotation of said sausage to cause said skin to be helically torn and stripped off the sausage.

3. A method of skinning a sausage, which comprises forming a tear initiating skin tab at the end of the sausage and placing said tab under stripping tension to cause the skin to be torn off the sausage as a helical strip.

4. A method of skinning a sausage, which comprises slitting the skin of the sausage transversely of the sausage near one end to define a skin appendage beyond the slit, placing said appendage under tension to rip the end section of the skin substantially along the plane of the slit and to form thereby a tear initiating tab at the end of the sausage, and holding said tab against movement with the sausage while the sausage is rotated and advanced endwise, to cause the skin to be torn off the sausage as a helical strip.

5. In a method of skinning a string of sausages, the steps comprising clamping the skin ligatures between successive sausages one after another, severing each ligature while clamped to separate the leading sausage of the string from the rest of the string, while maintaining the ligature appendage of the next sausage clamped, forming a tear initiating skin tab from said appendage, and then, after the ligature has been unclamped, placing said tab under stripping tension to cause the skin to be torn off said next sausage as a helical strip.

6. In a method of skinning a string of sausages, the steps comprising clamping and unclamping the skin ligatures between successive sausages one after another, severing each ligature while clamped to separate the leading sausage of the string from the rest of the string, while maintaining the ligature appendage of the next sausage clamped, slitting the clamped appendage transversely of the sausage, placing said appendage under ripping tension to tear the end section of the skin beyond the slit and to form thereby a tear initiating tab at the end of said next sausage, and then, after the ligature has been unclamped, placing said tab under stripping tension to cause the skin to be torn off the latter sausage as a helical strip.

7. In a method of skinning a string of sausages, the steps comprising clamping and unclamping the skin ligatures between successive sausages one after another, severing the clamped ligature to separate the leading sausage of the string from the rest of the string, while maintaining the ligature appendage of the next sausage clamped, turning said next sausage about its longitudinal axis while its ligature appendage is clamped to tension said appendage, slitting said clamped appendage transversely of the sausage while said appendage is tensioned, placing said appendage under ripping tension to tear the end section of the skin beyond the slit and to form thereby a tear initiating tab at the end of said next sausage, and then, after the ligature has been unclamped, placing said tab under stripping tension to cause the skin to be torn off the latter sausage as a helical strip.

8. In a method of skinning a string of sausages, the steps comprising clamping and unclamping the skin ligatures between sausages one after another, severing each clamped ligature to separate the leading sausage of the string from the rest of the string, while maintaining the ligature appendage of the next sausage clamped, slitting this clamped appendage transversely of said next sausage, bending the forward end section of said next sausage while the clamped section of said appendage is held, to tear the end section of the skin beyond the slit and to form thereby a tear initiating tab at the end of said next sausage, and then, after the appendage is unclamped, placing said tab under stripping tension to cause the skin to be torn off the latter sausage as a helical strip.

9. In a method of skinning a string of sausages, the steps comprising feeding said string continuously endwise, cutting the skin ligatures between successive sausages one after another, forming a tear initiating skin tab at the forward end of each sausage while it is being continuously advanced endwise, and placing said tab under stripping tension while moving said sausage endwise and while rotating said sausage to cause the skin to be torn off the latter sausage as a helical strip.

10. A method of skinning a sausage which comprises advancing the sausage axially to and beyond a point at which it is skinned while rotating it to cause each portion of the skin to travel to the point of skinning in a helical path, and separating the skin progressively from the sausage along a helical zone by pulling the skin tangentially away from the sausage at the point of skinning in the direction and at the speed of its arrival at such point.

11. A method of skinning a sausage which comprises advancing the sausage axially to and beyond a point at which it is skinned while rotating it to cause each portion of the skin to travel to the point of skinning in a helical path, pulling the skin away from the sausage at such point at the speed and in the direction of its arrival at said point, and continuing the travel of the skin in a circular path which is externally tangent at the point of skinning to the helical path travelled by the skin up to said point.

DANIEL DOUGLAS DEMAREST.
ROBERT MERRITT PERKINS.
WILLIAM KARIUS.
CARL BERENDT.

References Cited in the file of this patent
UNITED STATES PATENTS

| Number | Name | Date |
|---|---|---|
| 2,514,660 | McClure et al. | July 11, 1950 |